US007689717B1

(12) United States Patent
Munshi et al.

(10) Patent No.: US 7,689,717 B1
(45) Date of Patent: Mar. 30, 2010

(54) METHOD AND SYSTEM FOR DIGITAL RENDERING OVER A NETWORK

(76) Inventors: Aaftab A. Munshi, 17300 Laurel Rd., Los Gatos, CA (US) 95033; Avi I. Bleiweiss, 1494 Ormsby Dr., Sunnyvale, CA (US) 94087

( * ) Notice: Subject to any disclaimer, the term of this patent is extended or adjusted under 35 U.S.C. 154(b) by 0 days.

(21) Appl. No.: 11/515,371

(22) Filed: Aug. 31, 2006

Related U.S. Application Data

(63) Continuation of application No. 09/925,157, filed on Aug. 8, 2001, now Pat. No. 7,266,616.

(51) Int. Cl.
*G06F 15/16* (2006.01)

(52) U.S. Cl. ....................... 709/246; 709/231; 709/236; 715/240; 715/234; 715/229; 345/618; 345/473

(58) Field of Classification Search ................. 709/231, 709/236, 246; 715/523, 757, 234, 239, 240, 715/248, 229; 345/618, 473
See application file for complete search history.

(56) References Cited

U.S. PATENT DOCUMENTS

| | | | | |
|---|---|---|---|---|
| 6,289,299 | B1 * | 9/2001 | Daniel et al. | 703/21 |
| 6,427,234 | B1 * | 7/2002 | Chambers et al. | 717/140 |
| 6,636,874 | B1 * | 10/2003 | Douceur et al. | 707/201 |
| 6,847,384 | B1 * | 1/2005 | Sabadell et al. | 345/672 |

OTHER PUBLICATIONS

An Approach for an adaptive Visualization in a Mobile Environment, by Luc Neumann and Alberto Barbosa Raposo, Published by Springer-Verlag, London UK, 1997, pp. 1-11.*

* cited by examiner

*Primary Examiner*—Nathan Flynn
*Assistant Examiner*—Mohammad A Siddiqi
(74) *Attorney, Agent, or Firm*—McDonnell Boehnen Hulbert & Berghoff LLP

(57) ABSTRACT

A method, system, computer program product, and protocol for digital rendering over a network is described. Rendering resources associated with a project are stored in a project resource pool at a rendering service site, and for each rendering request received from a client site the project resource pool is compared to current rendering resources at the client site. A given rendering resource is uploaded from the client site to the rendering service only if the project resource pool does not contain the current version, thereby conserving bandwidth. In accordance with a preferred embodiment, redundant generation of raw rendering resource files is avoided by only generating those raw rendering resource files not mated with generated rendering resource files. Methods for reducing redundant generation of raw resources are also described, as well as methods for statistically reducing the number of raw resource files required to be uploaded to the rendering service for multi-frame sessions. The preferred embodiments are particularly advantageous for remote rendering services at a different site from the client and connected across the Internet or a Wide Area Network, but may also be applied where the rendering service is co-located with the client site and connected thereto by a Local Area Network (LAN).

38 Claims, 19 Drawing Sheets

METHOD AND SYSTEM FOR DIGITAL RENDERING OVER A NETWORK

CROSS-REFERENCE TO RELATED APPLICATIONS

This application is a continuation of U.S. application Ser. No. 09/925,157, which was filed on Aug. 8, 2001, and which issued as U.S. Pat. No. 7,266,616 on Sep. 4, 2007.

FIELD OF THE INVENTION

This patent specification relates to digital rendering systems. In particular, it relates to a method and system for efficient digital rendering over a network.

BACKGROUND OF THE INVENTION

Three-dimensional computer animation continues to intensely impact the visual arts world. In the entertainment industry, for example, three-dimensional computer animation has provided the sole basis for several motion pictures, and computer-generated visual effects are increasingly used to enhance or replace filmed scenery, special effects, and stunts in filmed motion pictures. Additionally, three-dimensional computer animation has furthered the sciences and practical arts by allowing, for example, visual analysis of product designs prior to physical assembly (e.g., aircraft designs), and lifelike visualizations of planned events (e.g., spacecraft landings).

As described in Kerlow, *The Art of* 3-*D Computer Animation and Imaging*, Wiley & Sons, Inc. (2000), the production stage in the process of three-dimensional computer animation includes the steps of modeling, animation, and rendering. These tasks usually take place in a computer animation studio in a collaborative effort among many creative, technical, production, and/or administrative personnel (hereinafter "users"), although there may be only a single user for the simplest endeavors. The computer animation studio may comprise one physical site or may be distributed across several sites, in which case the sites are usually connected by a wide area network.

Modeling refers to the creation of the virtual characters, objects, and environments that will be used in the movie or feature being produced. Computer modeling can occur using a wide range of computer based three-dimensional techniques, ranging from virtual modeling techniques for the direct creation of virtual objects, to the use of three-dimensional digitizers to capture the shape of real-world objects and form virtual objects therefrom. For each object, the modeling process yields a body of numerical and symbolic information (hereinafter "model") that describes its geometry and other characteristics, usually in isolation from other objects. Models of different but related objects (e.g., hat, arm, spurs) can be grouped together in defining a model of a larger object (e.g., cowboy) as needed. From a computing perspective, an object model comprises a file or array comprising numerical and symbolic information sufficient to define the object according to a high-level modeling language. Examples of high-level modeling languages include VRML (Virtual Reality Modeling Language), Lightwave, Softimage, Maya, and 3D Max formats. The size of the file or array containing the model will increase, of course, as the complexity of the model increases. Once the virtual actors and objects are modeled, they can be arranged on a virtual stage and animated.

Animation refers to the incremental changing of the positions and orientations of models in three-dimensional space, such that samples of the models and their arrangement on the virtual stage can yield an illusion of continuous action when viewed in succession. Computer animation techniques range from keyframing animation in which starting and ending positions are specified for all objects in a sequence, to motion capture in which all positions are fed to the objects directly from live actors whose motions are being digitized.

The animation process results in a sequence of logically related samples that together form a "shot," with a collection of logically related shots forming a "scene" of an overall production. As known in the art, the term "scene" additionally refers to the selection and configuration of the virtual objects, characters, and environments that are the subject of the sequence being animated. Thus, for example, a computer-animated feature film may contain a scene of a wild West gunfight, the scene comprising virtual models of two cowboys, their horses, and a crowd positioned against a virtual town environment, the scene further comprising a first shot of a close-up of one cowboy as he warns the other cowboy, a second shot of the cowboys pointing their guns at each other, a third shot of the crowd gasping, and so on.

From a computing perspective, the result of the animation process is a sequence of three-dimensional representations of object models in progressively different positions and orientations, each member usually being expressed according the same high-level modeling language supra. At this point, the virtual objects are still expressed in three-dimensional form and are not suitable for viewing, except perhaps in "wireframe" renditions as the animation is perfected. Once the virtual objects are modeled and animated, they can then be rendered.

Rendering refers to the process of visually representing the animated models with the aid of a simulated camera, thereby producing the output images that are actually viewed by the audience. In many ways, the rendering process is analogous to the cinematography process for standard filmed movies. A Hollywood cinematographer must optimally capture physical actors and objects on a movie stage with a properly positioned camera, carefully selected lighting, and other carefully selected parameters for transferring the scene onto a tangible two-dimensional viewable medium (film). Likewise, the computer rendering process must optimally capture virtual actors and virtual objects on a virtual three-dimensional stage, capturing them with a properly positioned simulated camera, carefully selected virtual lighting, and other carefully selected parameters for transferring the virtual scene onto a tangible two-dimensional viewable medium (a digital image file). The output of the computer rendering process is a sequence of two-dimensional images that form the final product viewable by an audience. The lighting of the scene and the shading characteristics are often specified before the animation is laid out, but the rendering itself, the calculation of the finished images, necessarily happens after the modeling and animation parameters have been defined.

The production-stage tasks of modeling, animation, and rendering can be performed using any of a variety of application software packages ranging from proprietary software solutions to commercial off-the-shelf software packages. Because there is tremendous latitude in the way production-stage tasks might be achieved, different commercial software packages have arisen and/or evolved that perform different combinations and sub-combinations of the above production-stage tasks. Thus, some software packages may be for modeling only or animation only, other packages may perform both modeling and animation, still other packages may perform rendering only, and still other packages may perform all three functions.

Additionally, many adaptors and interfaces exist for allowing, for example the rendering engine of a first package to render the modeled and animated data generated by a second package, commonly through a "plug-in" that allows the user to remain in the environment of the second package while manipulating the rendering data and rendering controls. By way of example and not by way of limitation, RenderMan™ is a popular collection of rendering tools available from Pixar Animation Studios, Inc. of Emeryville, Calif., that includes a rendering program, a scene description interface, and a shading language. A user may choose to use Maya®, a popular modeling and animation package (also capable of rendering) available from Alias/Wavefront of Toronto, Canada, to model and animate a scene, and then use MTOR, a RenderMan plug-in developed for Maya, to connect Maya to the RenderMan engine. Maya primitives are converted into a RIB (RenderMan Interface Bytestream) file. The RIB file is then interpreted by the RenderMan engine to produce rendered frames.

It is to be appreciated that while some terminology infra may have some elements in common with the RenderMan package, the Maya package, or other commercial software packages, the descriptions of the preferred embodiments are not intended to be limited to these restricted environments. Rather, the preferred embodiments described infra may applied in many different contexts using any of a variety of modeling, animation, and/or rendering programs. The preferred embodiments described herein are generally applicable to any environment in which rendering data and rendering controls are produced by a modeling application, an animation application, or other graphics application, and are then provided to a rendering engine that produces rendered frames.

Most commonly, to carry out the rendering process, the user manipulates their modeling application (e.g., Maya, Lightwave, etc.) to generate rendering data and rendering controls. The user then instantiates a rendering process in which the rendering data and rendering controls are submitted to a rendering engine. In a process that is highly computationally intensive, the rendering engine then produces rendered frames in the form of digital image files in any of a variety of formats (e.g., jpg, gif, tif, etc.). The process is highly iterative, with the rendering data and/or rendering controls being modified and tweaked until the desired output is achieved. Generally speaking, each time any portion of the rendering data or rendering controls is adjusted, the entire computing process performed by the rendering engine must be repeated.

More specifically, the user manipulates their modeling application in a first step of getting the models to be rendered from some kind of peripheral storage device like a hard disk. These models usually include virtual characters, props, sets, and other objects. In another step, a simulated camera is maneuvered in virtual x-y-z space so that the user can look at the portion of the environment they are interested in. They might reposition the camera, tilt it, change the focal point and depth of field, and adjust proportions and resolution parameters. In another step, the lighting scheme is designed, the user placing at least one light source, and often several light sources, in the three dimensional space of the computer software. In another step, the user specifies many characteristics of the surfaces of the objects including color, texture, shininess, reflectivity, and transparency. Selection of these rendering parameters will have a great impact on the quality, refinement, and energy of the rendered frames produced by the rendering engine. Finally, the user selects a shading method (e.g. faceted, smooth, specular, RenderMan, etc.). Further descriptions of shading methods and other specific rendering controls can be found in Kerlow, supra. For purposes of the present disclosure, it is of significance primarily to note that each of the many sets of user modifications/tweaks of the rendering data or the rendering controls results in the need for an additional rendering job to be submitted to the rendering engine.

After rendering controls and rendering data are specified, the user submits a rendering request to instantiate the transfer of the rendering data and the rendering controls to the rendering engine. This is usually performed by pressing a "render" control button provided by the rendering engine plug-in to the modeling application. The modeling application then provides the rendering data and rendering controls to the rendering engine.

As known in the art, when the geometry or shading in any given scene are too complex, it is common to render different components of a scene in separate layers. The rendered layers are then later composited in a post-production process. For clarity of disclosure, the term "rendered frame" is used to identify a rendered output corresponding to one time sample of a shot, scene, or a layer thereof, it being understood that layered outputs would be later composited to form the actual output image viewed by the audience. The rendered frames are usually displayed to the audience at a rate of 24 frames per second (fps) for film and 30 fps for video. A rendering session maps on to a subset of a movie production flow—be it a scene or a shot, or on to a smaller rendering task. The larger extent of the workflow, for which sessions are conducted is termed a project.

FIG. 1 shows a conceptual hierarchy of rendering data and rendering controls as provided from a modeling application/rendering engine plug-in upon instantiation of a rendering request. Rendering data 102 generally comprises appearance parameters and geometry parameters. Appearance parameters comprise shaders, provided in the form of shader files, and textures, provided in the form of texture files. As known in the art, shaders control the appearance of the site of the scene, specifying, for example, lighting and surface behaviors (e.g., matte, plastic, specular, etc.). Also as known in the art, textures are used to further specify the appearances of surfaces, and are provided in the form of 2-D image files, or alternatively as 3-D image volumes that comprising a plurality of related 2-D image files. Textures are usually very large data files, exceeding a total volume, for example, of 250 Gbytes for an entire project. There is a dependency between shaders and textures in that the shaders reference textures in mapping the textures onto objects during the rendering process.

Geometry parameters comprise procedural geometry information ("procedurals"), provided in the form of procedural geometry files ("procedural files"), as well as geometries provided by the scene description files. As known in the art, procedurals are used to describe geometric elements in terms of algorithms, rather than in terms of simple coordinates, providing a way to model more complicated objects. Scene description files describe the overall scene in terms of both scene descriptions and object geometries. They are first specified by a modeling program, supra, responsive to manipulations by a user. Thus, scene description files are considered to contain both geometry information on the rendering data side of FIG. 1, as well as scene description information on the rendering controls 104 side of FIG. 1. The scene description file is where all the geometry (polygons, surfaces), as well as shaders and procedurals, are referenced. As indicated in FIG. 1, and as used herein, rendering resources shall refer to the collection of scene description files, shader files, texture files, and procedural files used by the rendering engine in generating rendered images.

FIG. 2 shows a conceptual diagram of the "generation" process associated with rendering resources in most conventional 3-D computer animation systems today. Generally speaking, as a result of user manipulations, the modeling application will provide raw shader files 202, raw procedural files 204, and raw scene description files 208 for downstream rendering. Although they are automatically created by the modeler, these raw or "uncompiled" files are usually in ASCII format or other human-readable format and are not directly usable by the rendering engine. Rather, they must first be compiled or "generated" in a preprocessing step prior to use by the rendering engine.

As indicated in FIG. 2, generation of raw shader files 202 (provided in the form of .sl, .c, .cpp. or .h files as known in the art) is an intrinsic process that depends largely on a set of independent shader make parameters 210, also provided by the modeling application. Upon generation, generated shader files 218 (e.g., so files) can be provided to the rendering engine. Likewise, generation of raw procedural files 204 (provided in the form of .c, .cpp. or .h files as known in the art) is an intrinsic process that depends on independent procedural make parameters 214, and generation of raw scene description files 208 (e.g., provided in the form of .rib files as known in the art) is an intrinsic process that depends on independent scene description make parameters 216. Upon generation, generated procedural files 220 (e.g., .so files) and generated scene description files 224 (e.g., .rib files) can be provided to the rendering engine.

Unlike the other rendering resource files, texture files 206 (e.g., tif, jpg, gif, etc) may be created separately from the modeling application, e.g., a user may have get them from digital camera outputs, artist drawings, and the like. However, texture files 206 may also be modified or provided by some modeling applications. Texture files usually also require generation, in the form of image processing algorithms such as blurring, edge enhancement, etc. Unlike the other rendering resource files, the generation of texture files 206 is not implicit, but requires information from the scene description file 208 as well as texture make parameters 214. Accordingly, texture generation is a highly scene-dependent, and even frame-dependent, task. Upon generation, generated texture files 222 (e.g. .tif, .jpg, .gif, etc.) may then be provided to the rendering engine. The above generation tasks may be performed by the rendering engine itself in a preprocessing task, or may be performed by auxiliary systems prior to job submission.

A problem arises in conventional 3-D computer animation studios today as a result of the massive computational power needed by the rendering engines. There is a trade-off between capital investment in computing resources (in the form of large "rendering farms") versus the speed at which rendering can happen. For studios large enough to have their own rendering farm, the rendering farm is usually connected to a team of users over a local area network (LAN). Conventionally, rendering jobs are submitted separately by individual users, whose rendering jobs sit in a queue until the rendering engine is available for that job. An administrator (usually a human) often makes real-time decisions about task prioritization among jobs in the queue. According to an exemplary prior art system, generation of rendering resources is not coordinated in a systematic manner, and often the rendering engine and other network resources end up performing redundant generation and/or rendering tasks. The conventional scenario may be particularly frustrating for a user who has only made a minor tweak or addition to their model or another rendering resource. For example, while the user may have simply moved the position of a light, they must again wait in the queue, have their rendering resources generating, and have the rendering process repeated.

Bottlenecks and inefficiencies caused by limited studio computing resources may be remedied somewhat by online rendering services that rent computing time to remote users on a per-session basis. For a price, a remote user may submit their rendering resources (raw or generated) to the online service and, for a greater price, may have their rendering jobs given high priority in the online queue. One shortcoming of conventional online rendering services, however, lies in the massive amount of data that needs to be transferred across the internet. While shader files and procedurals may generally be "slim" resources not requiring excessive bandwidth, scene description files and textures can be massive in size. By way of example, a typical session for rendering frames corresponding to ten seconds of an animated feature would require the transfer of about 2 Gbytes of data for the scene descriptions (raw or generated) and 2 Gbytes of textures. There can be up to 250 Gbytes of textures corresponding to an overall project. Accordingly, it could be quite frustrating for a remote user who has made a minor tweak in their rendering resources to require resubmission of these massive amounts of rendering resource data to the online rendering engine.

SUMMARY OF THE INVENTION

A method, system, and protocol for digital rendering over a network is provided, wherein a rendering service receives a rendering request from a client, and generates rendered frames responsive to the rendering request. In accordance with a preferred embodiment, rendering resources associated with a project are stored in a project resource pool at the rendering service site, and for each rendering request the project resource pool is compared to the current rendering resources at the client site. A given rendering resource is transmitted from the client site to the rendering service only if a current version of that rendering resource is not contained in the project resource pool. Advantageously, bandwidth between the client site and the rendering service site is conserved when many related rendering requests are submitted, such as when a user makes minor tweaks and modifications to one or more rendering resources between sessions.

Preferably, rendering resources are transmitted from the client to the rendering service in raw format, for providing platform-independence of the rendering service among various client modeling and animation software and hardware packages. Raw rendering resource files specified in the rendering request are validated in the project resource pool by comparing the project resource pool against the current raw rendering resource files at the client site. Only invalid raw rendering resource files are uploaded from the client site. The raw rendering resource files are preferably chunked on a per-frame or per-tile basis. Raw rendering resource files are generated or made into generated rendering resource files and submitted to the rendering engine. In accordance with a preferred embodiment, redundant generation of raw rendering resource files is avoided by only generating those raw rendering resource files not mated with a generated rendering resource files.

In accordance with another aspect of the invention, a modeling program is manipulated such that a resulting scene description is modularized into at least one static scene description file and one dynamic scene description file. The static scene description file contains geometries and other primitives that generally do not change among successive frames of a session, while the dynamic scene description file contains geometries and other primitives that do change among successive frames of a session. When a rendering request for the session is submitted in accordance with the above protocol, a statistically fewer number of rendering resource files will be uploaded to the rendering service because the static scene description files will be constant across many frames and therefore not uploaded for those frames.

DETAILED DESCRIPTION

The preferred embodiments described herein may be advantageously used in conjunction with the system described in Nicolas et. al., "Method and System for Creating and Managing a Digital Content Creation Project Over a Network," U.S. Ser. No. 09/738,466, filed Dec. 15, 2000, (BEL-020), which is assigned to the assignee of the present invention, and which is incorporated by reference herein. A remote rendering protocol (rrp) refers to methods and protocol items used to provide an efficient, reduced-redundancy rendering service for rendering data produced at a client site, as described herein. A goal of the rrp is to establish a fundamental interface for the rendering service. The rrp provides user authentication, session control, render description, status control and monitoring, and resultant image transfer dialog items.

The challenge of a qualitative remote rendering service is on both the imagery produced and the ability to sustain a balance between rendering compute time and transfer of resources and images over the WAN/Internet. In addition, tightly securing user resources, uploaded and safely stored on the rendering service site, plays a major role in gaining market acceptance of the service. A secure site with provisions to remotely manage storage transparently has the potential for the user to forego expensive local resource management on their end.

While the preferred method, system, and protocol is advantageously employed by a remote rendering service distant from the client site and connected thereto over the Internet or other Wide Area Network (WAN), it is to be appreciated that the preferred embodiments described herein are not limited to this scenario. For example, the preferred embodiments may also be applied where the rendering service is co-located with the client site and connected thereto by a LAN.

Figure 3:
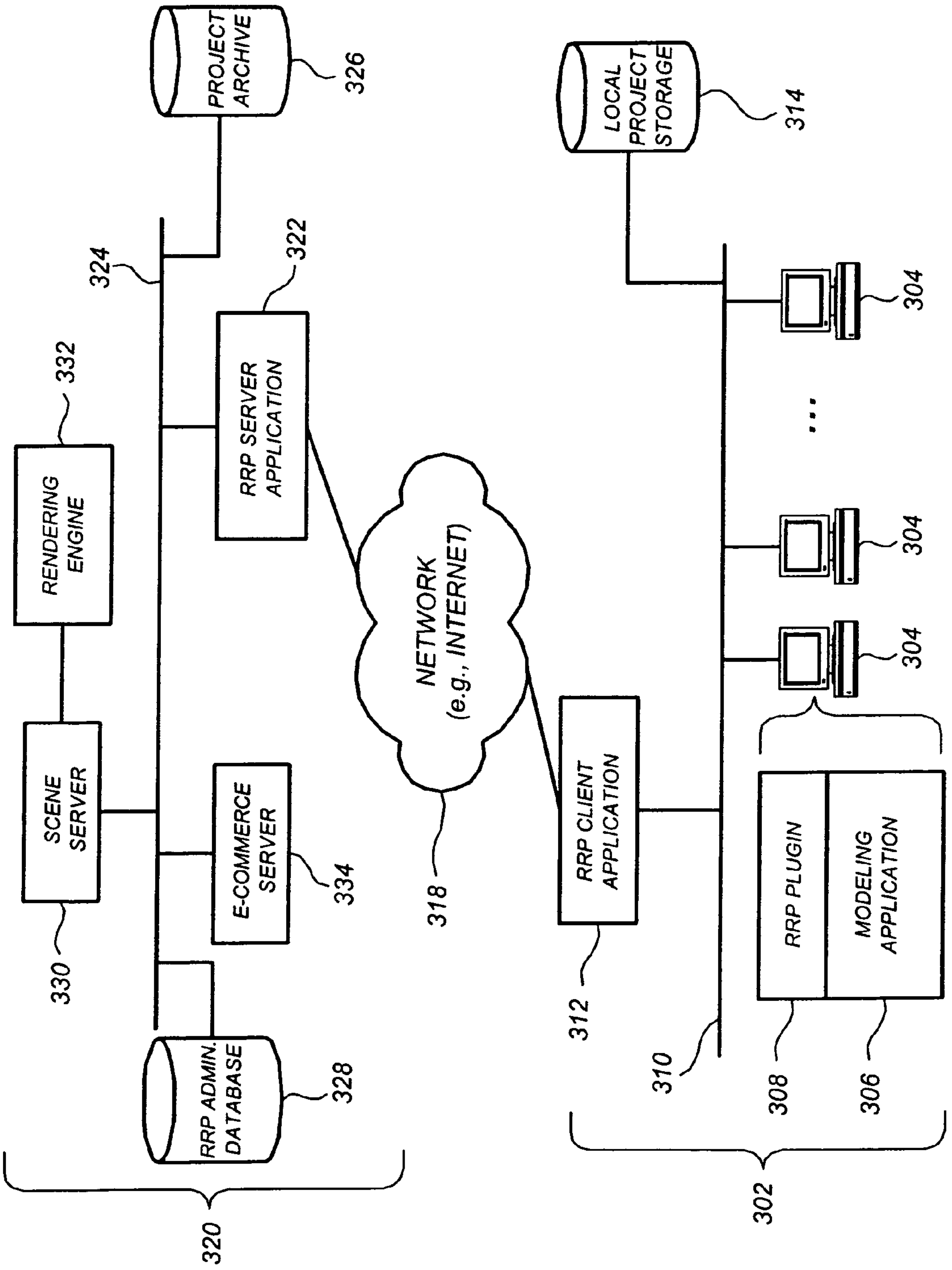
FIG. 3 shows a diagram of a rendering service and a rendering client site in accordance with a preferred embodiment.

FIG. 3 shows a diagram of a rendering service 320 (also termed a host site) and a rendering client 302 (also termed a remote site) in accordance with a preferred embodiment, coupled across a WAN 318 such as the Internet. Client site 302 comprises a plurality of workstations 304 to interface with a plurality of users on a project, each workstation 304 comprising modeling application 306 and an rrp (remote rendering protocol) plug-in 308. An rrp client application 312 (hereinafter "rrp client"), usually running on a dedicated workstation, is connected to the workstations 304 over a LAN 310. Also accessible to workstations 304 over LAN 310 is a local project storage archive 314. While shown as a separate element in FIG. 3, a local project storage archive 314 may be distributed across one or more workstations or other nodes. Advantageously, the references to file locations are full pathnames in the rrp, so a single project storage archive, while recommended, is not required. Indeed, resources may be distributed across several local area networks if desired.

Rendering service site 320 comprises an rrp server application 322 (hereinafter "rrp server"), a scene server 330 coupled to a rendering engine 332, a project archive 326, an e-commerce server 334, and an rrp administrative database 328 coupled by a LAN 324. While preferably on separate server machines, these devices may be generally be integrated onto a single scalable platform, or may be integrated in any combinations on common devices. The software for both the rrp client 312 and the rrp server 322 is, for example, Java based to ensure portability across platforms. The devices of FIG. 3 are adapted and configured to perform the functionalities described herein, it being understood that a person skilled in the art would be readily able to implement the remote rendering system of FIG. 3 in light of the present disclosure.

Figure 4:
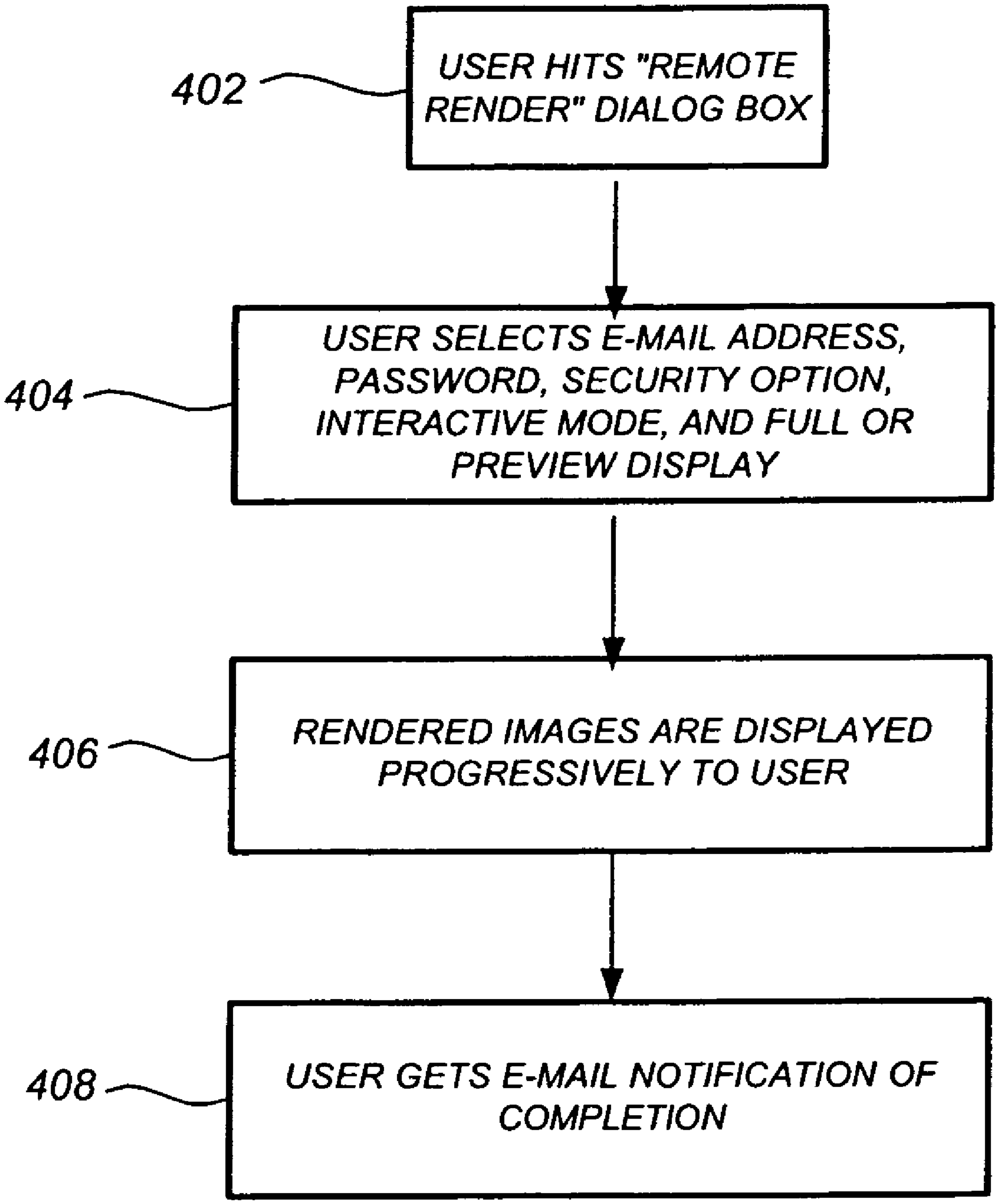
FIG. 4 shows steps corresponding to operation of a rendering service as experienced by a user for an interactive mode in accordance with a preferred embodiment.

FIG. 4 shows steps corresponding to operation of a rendering service as experienced by a user for an interactive mode in accordance with a preferred embodiment. The rrp may be exploited in either an interactive or in a batch mode. The rrp may commence in either a push or a pull manner to address both interactive and batch rendering modes, respectively. The user interacts with a modeling application, and at a given point will spawn a rendering request. A rendering response is then awaited, for which displayable, resultant images are downloaded to the remote site. Alternatively, a stack of scene descriptions could be prepared up front and be submitted for remote rendering at a later stage or perhaps in a prescribed time window.

The round trip of a rendering request and a rendering response pair is termed a session. In interactive mode a single session is invoked at a time and iteratively rendering parameters are tweaked and modified to address acceptable quality level of imagery. In a larger production scope, a session maps on to a scene, a shot or a layer (in a movie context), often times bearing little dependency on each other. A rendering session group is then formed and concurrent sessions are conducted, utilizing the high rendering power of the rendering engine 332.

The rendering service (also termed remote rendering service herein) is part of a larger workflow scope and is intended to seamlessly integrate in an already existing behavioral model on the user end. A remote rendering session maps on to a subset of a movie production flow—be it a scene or a shot, or on to a smaller rendering task. The larger extent of the workflow, for which sessions are conducted, is termed a project. The user submits rendering sessions at their own pace. The user allocates anticipated frames per session and assigns scene description, shader, texture and procedural resources from its own structured storage pool. The rrp simply requires a path or a universal resource locator (URL) to these resources in order to perform remote rendering. Resultant rendering images, once downloaded to the remote site, are extracted from the rrp client space and are integrated into the next remote production step—image compositing.

The invocation of remote rendering from a given animation application e.g. Maya, PRMan, 3D StudioMax, is via a "render" dialog box. In this dialog box the user authenticates to the rendering service site and sets workflow related rendering parameters before submitting a session. Workflow parameters include interactive (default) versus batch mode, and full versus preview display resolution.

In interactive mode the user runs the animation application and at some point hits the "render" dialog box (step 402). Consider the single frame, rendered to display case, first. The user then chooses one of full or preview resolution options and submits his rendering request. The rrp plug-in 308, associated with the modeling application 306, opens a window on the user's screen where the above workflow related rendering parameters are entered (step 404). Transparent to the user, the rrp client commences a rendering session. As soon as the first rendered image tile is available on the rendering service site, the rrp server 322 sends it back to the rrp client 312. The rrp client 312 streams it on to the rrp plug-in 308, which refreshes the opened window on the user screen (step 406).

Multiple frames are handled similarly in a progressive manner. Frame images destined to a file are treated similarly, avoiding opening a rendered display window. The rrp client 312 passes to the rrp plug-in 308 a rendering summary log for future user reference. Billing and session completion email notification (step 408) are further sent out to the user from the e-commerce server 334. The interactive scenario presented makes the rendering process substantially transparent regardless of running it locally or remotely.

Figure 5:
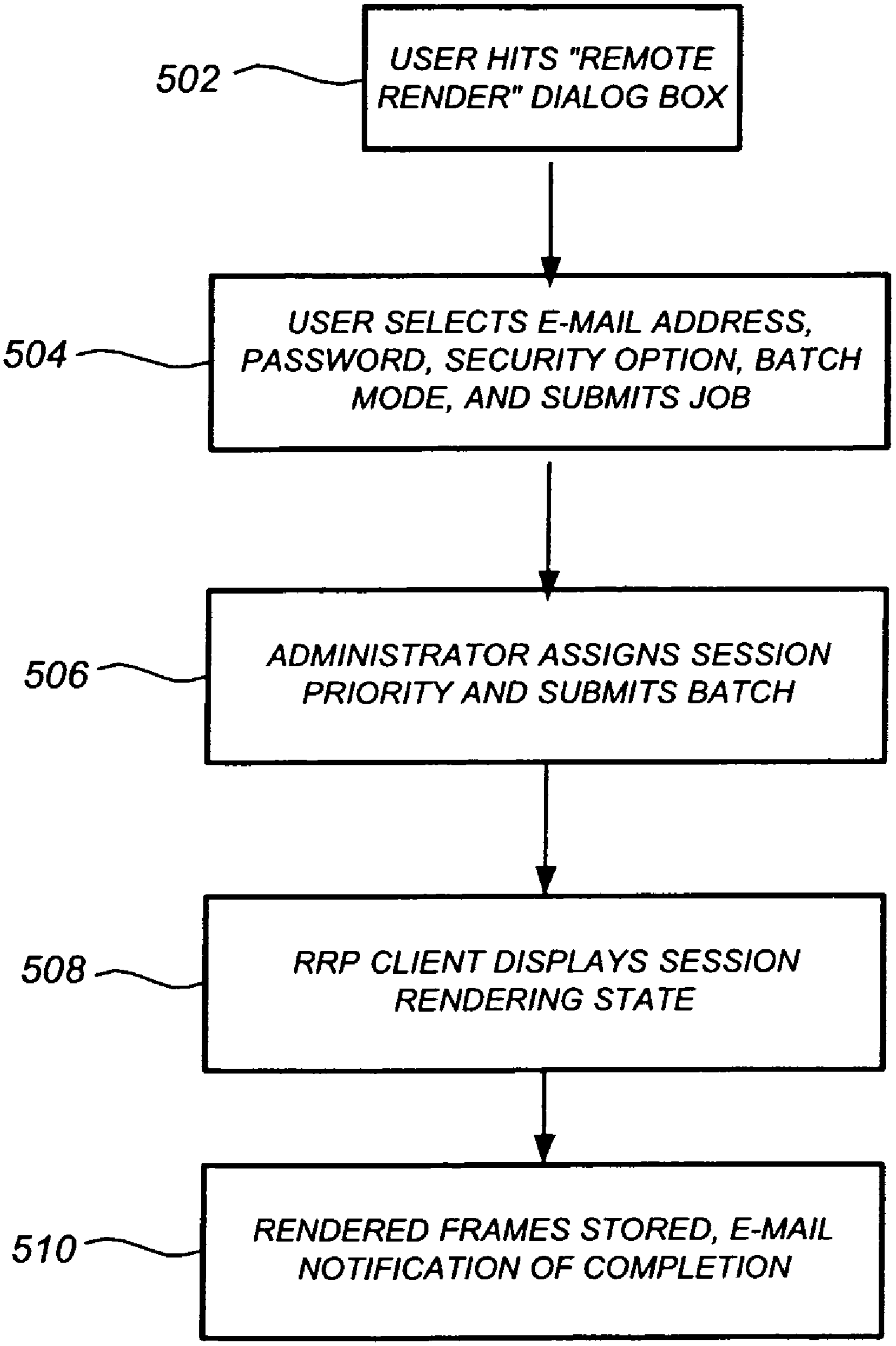
FIG. 5 shows steps corresponding to operation of a rendering service as experienced by a user for a batch mode in accordance with a preferred embodiment.

FIG. 5 shows steps corresponding to operation of a rendering service as experienced by a user for a batch mode in accordance with a preferred embodiment. Batch mode rendering involves a project administrator (not shown) on the remote site. Initially, users run the modeling application 306, each covering a unique portion of the overall project. At a given point they will submit a remote rendering request (step 502) similar to the manner they operate in interactive mode. However, in the dialog box, the batch rendering mode box will be checked (step 504). The rrp plug-in 308 deposits session(s) control information in identical manner as in the interactive case. However, there will be no action by rrp client 312 for submitting the request remotely to the rendering service site.

Once the stack of rendering sessions has been prepared the project administrator will setup the batch for rendering using the rrp client batch tool (step 506). In this process the administrator assigns a priority to each session and then submits the batch for rendering. Throughout the batch rendering the rrp client displays the current state of rendering for each session (step 508). Rendered images are returned by the rrp server to the rrp client and are stored at a prescribed location and an e-mail notification of completion is sent (step 510). Note that in batch mode rendered images are always stored into a file. Overall rendering efficiency for batch mode is a concern and overlap of transfer and rendering is significant. Again, batch mode is fairly transparent to the user who drives the application. As per the project administrator, the process is similar to a localized batch rendering process.

In accordance with a preferred embodiment, the remote rendering protocol upon which a request/response oriented communication is based between the rrp client 312 and the rrp server 322 includes the following items: (i) live, (ii) authenticate, (iii) render, (iv) display, and (iv) status. The sequence of the first four protocol elements establishes the end-to-end rendering session supra (or a session group under the same authentication act, for batch mode). Every session is unique and is associated with a session ID. The ID facilitates data caching on the rendering service site in the case of session resubmit, discussed further infra.

The live protocol instance establishes a connection to the service, checking that the rendering service is up and running. The authenticate item validates the proper registration of a user to the service. A successful authentication creates an initial session ID (and optionally a range of session IDs, once in batch mode) for the successive protocol items. This item is conducted in a secure manner to ensure customer privacy.

According to a preferred embodiment, authentication parameters are keyed in a localized authentication control xml file "authen.xml" (see Appendix A, infra). The authentication protocol accepts an option for which a fully secured session is conducted throughout its entirety, once desired by the user. Again, this is to ensure a higher level of rendering privacy. Batch rendering is optionally set in the authentication protocol to override the default interactive mode. A failed live or authenticate protocol item results in service suspension until outstanding issues have been resolved.

The render item is used to provide the rendering service the identification of the rendering resources required to commence rendering. The resources include scene description files, shaders, textures, and procedurals. Identification of the rendering resource files is encapsulated in a session control xml file "session.xml," depicting the proper rendering resource bindings throughout the process. In addition, session metadata is embedded in the session control file for the purpose of registering job assignment and generic database parameter inserts into the rrp administration database 328. The metadata recorded is aimed to facilitate future tracking and mining. A sample session control file is illustrated in Appendix B.

Figure 1:
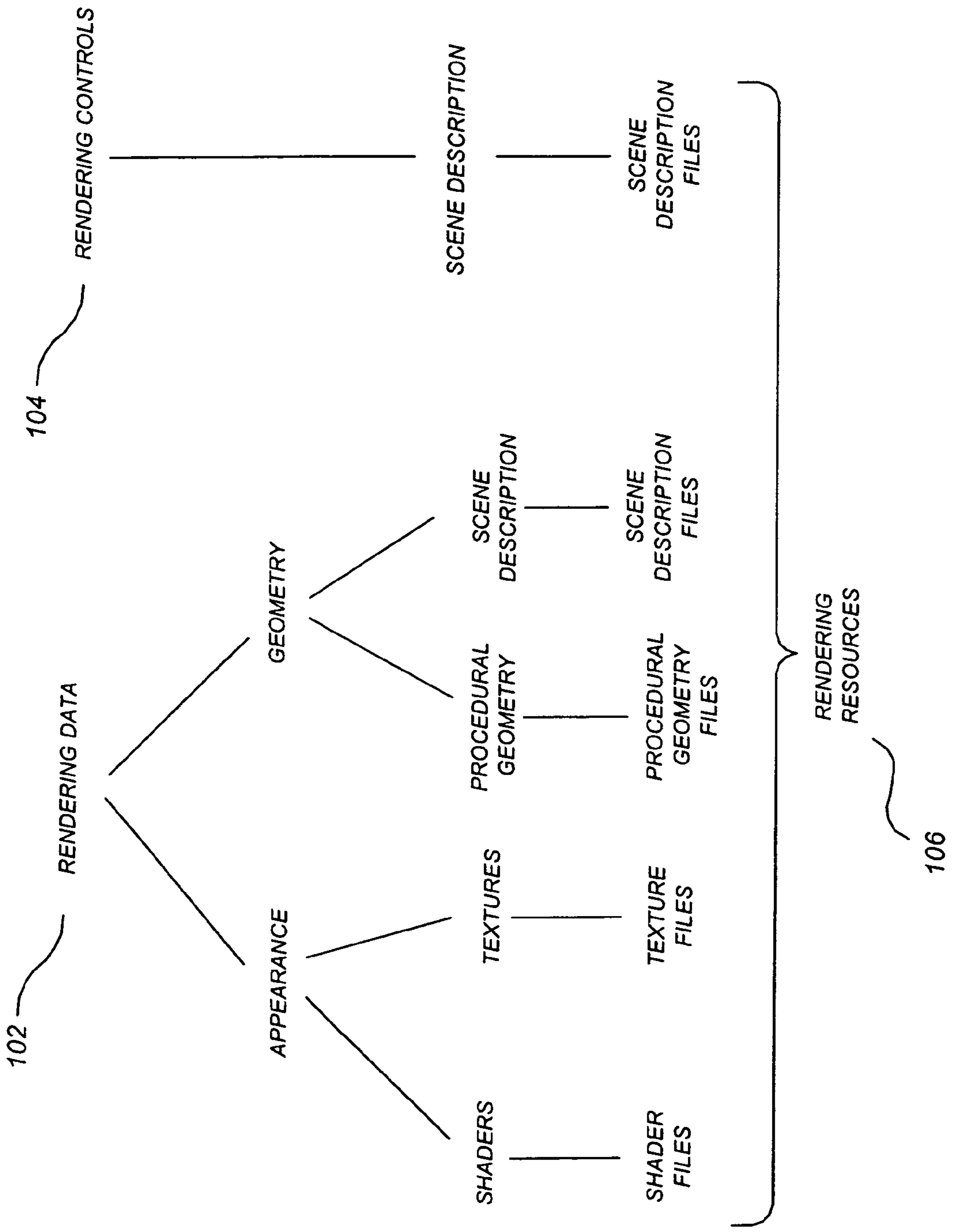
FIG. 1 shows a conceptual hierarchy of rendering data and rendering controls as provided from a modeling application/rendering engine plug-in upon instantiation of a rendering request.
Figure 2:
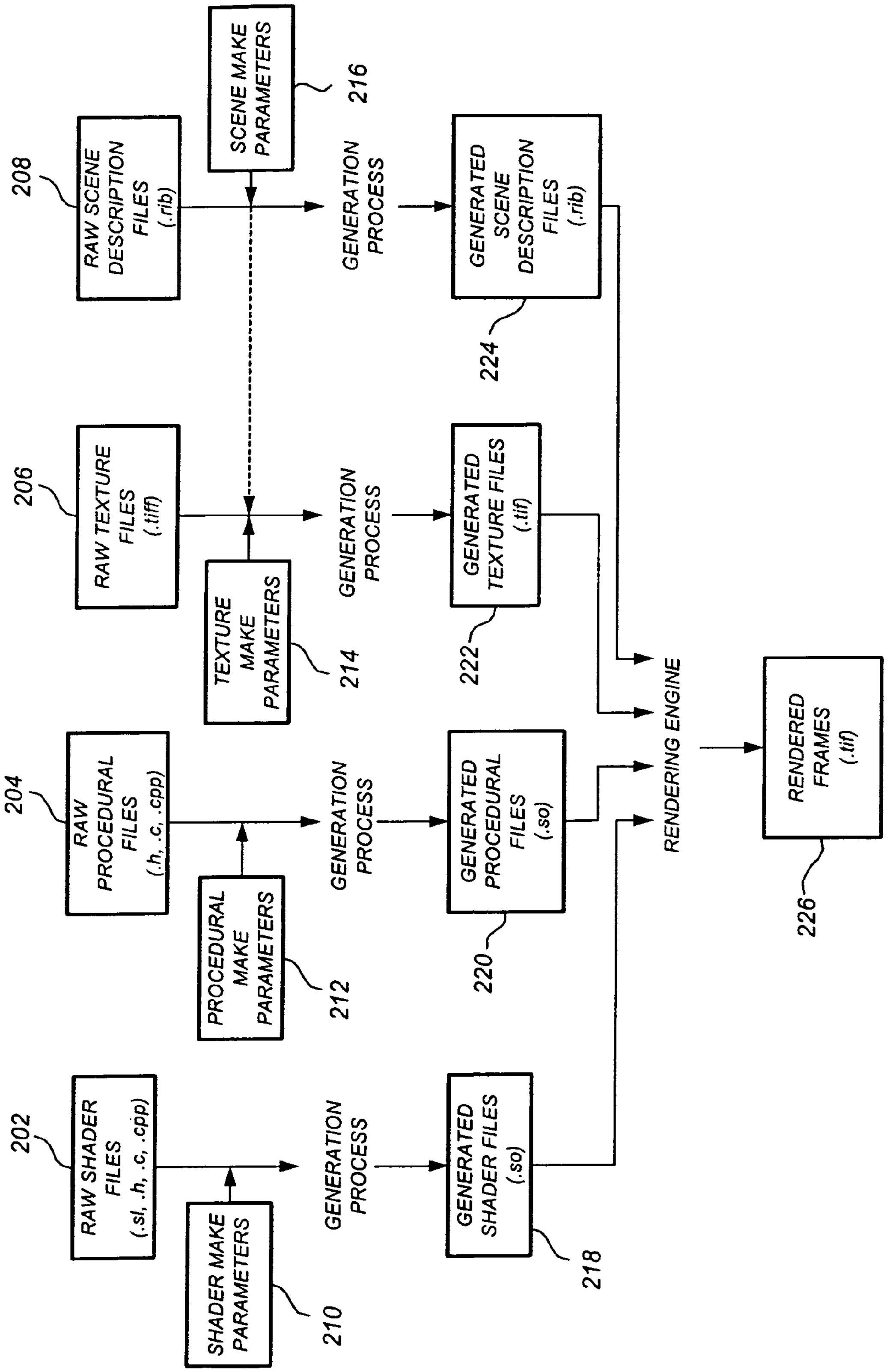
FIG. 2 shows a conceptual diagram of a generation process associated with rendering resources.

As described supra with respect to FIG. 2, raw rendering resources are required to be generated before being sent to the rendering engine. Resource generation is not implied in the rrp protocol itself. However, the rrp protocol provides an infrastructure for customization based on user preferences, format conversion, and grouping of resources. While resource generation is not implied in the rrp protocol itself, according to a preferred embodiment, resource generation is performed at the rendering service site in a manner that saves overall system bandwidth and processing effort. Rendering resource generation is performed according to settings specified in resource generation control files, in particular, a scene description resource generation control file "scene_gen_control.xml," a shader resource generation control file "shader gen_control.xml" (see Appendix D, infra), a texture resource generation control file "texture_gen_control.xml" (see Appendix E), and a procedural resource generation control file "procedural_gen_control.xml" (see Appendix F).

The generation control xml files are usually optional for scene descriptors, shaders and procedurals, mostly since these resources abide by default generation criteria. However, the texture control file is mandatory at the rrp protocol level once texture resources are present. If the generation control xml files are not provided for the scene descriptors, shaders, textures, or procedurals, then the protocol implies their default generation using sensible parameters.

Rendering resource files, in particular scene description and texture files, are likely to be fairly large, in the order of tens of megabytes. In accordance with a preferred embodiment, to avoid costly network retries due to a faulty network, rendering resources files are chunked to smaller, favorable quanta prior to their transfer. Preferably, the logical chunking scheme for scene description files is frame boundaries. Similarly, tiling is a preferred method for textures, which enhances specificity of access by the rendering service.

The display protocol item is created by the rendering service and transferred from the rrp server 322 to the rrp client 312, indicating a successful (or unsuccessful) session result. This is normally followed by a downloading of final rendered images, on a per frame basis. The default image file format is .tif in order to support a wide variety of image types and formats (e.g. a floating point, four color channel image entity). The response message entails a display control xml file (see, e.g., Appendix C, infra). The file contains useful customer info to be kept as a history log for future reference e.g. overall rendering time for the session, image type, format and resolution, on a per-frame basis.

The status protocol item is interspersed in the rrp protocol in tandem with the render item. The purpose of the status protocol item is to periodically query the rendering status of the outstanding rendered frames in the session. The per-frame status information provided by the server to the client primarily includes analog progress and rendered status, e.g., success or failure. This data is readily available for graphical display. The rrp is extensible and items can be added to augment functionality, as necessary. An example of a status.xml file is provided in Appendix G, infra.

The rrp client 312 provides a thin layer interface between the animation or modeling application 306 (via the rrp plug-in 308) and the rendering service site. The rrp plug-in 308 generates object and frame scene description files and potentially shader files, every time the user interacts with the render application dialog box. The rrp client 312 is substantially transparent to the user, and is invoked by the rrp plug-in 308 indirectly for submitting a rendering session. In both interactive and batch modes, the rrp plug-in 308 pushes authentication and session control files into a prescribed sessions structure in local project storage 314, as described infra with respect to FIG. 6. The rrp client 312 in turn parses the control files and copies (or uploads) rendering resource files over the internet from local project storage 314 onto the rendering service site, according to results of a validation process performed at the rendering service site. Scene description files are divided into global, geometry and appearance types. Global scene description files capture global rendering state parameters (e.g. display resolution, sampling rates, level-of-detail), which apply to all subsequent frames. Geometry comprises either static or dynamic primitives. Static geometry is retained throughout the extent of the animation frames. Deformed geometry is dynamically changing across frames (and not necessarily all frames). Both dynamic geometry and appearance files are chunked on a per frame basis.

The rrp client 312 communicates with several users of workstations 304 concurrently. In interactive mode the rrp client 312 receives from each application user (via the rrp plug-in 308) the network identification of its host so that returned display images will get properly routed to the expected destination. Batch mode implies an additional process step on the client side. The project administrator consults an rrp client batch tool to register sessions and assign promptness and billing criteria. Only then, the stack of sessions are submitted for rendering. The rrp client 312 provides an essential rendering progress report of each of the session batch members once a batch has been submitted.

The rrp client provides the project administrator means to abort a session in the middle, for any reason in either interactive or batch modes. The client sends an abort message to the server to remove it from the rendering queue.

Figure 6:
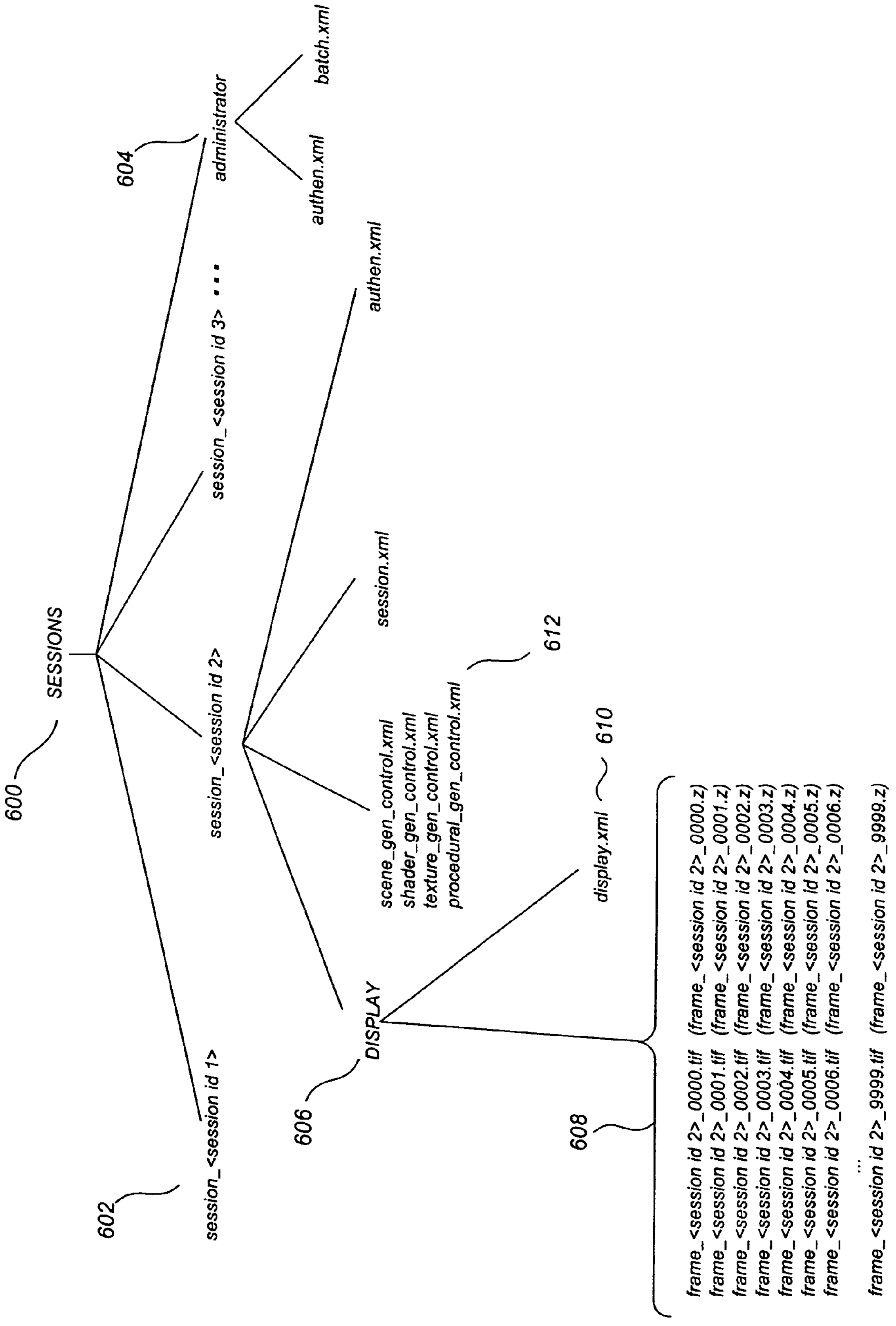
FIG. 6 shows a diagram of a rendering session storage hierarchy at the client site in accordance with a preferred embodiment.

FIG. 6 shows a diagram of a logical local session hierarchy located, for example, at the local project storage device 314 at the client site in accordance with a preferred embodiment. A prescribed session folder hierarchy structure is preferred on the client site. At the top of the hierarchy is the sessions folder 600. The sessions folder 600 is a sharable folder exposed to the rrp client 312 for both the fetch and the store of rrp data. Located one level down are the per-session folders 602 and administrator folder 604. Preferably, a session folder name is composed of a constant prefix "session" followed by a unique identifier, which describes the session production scope. However, any of a variety of file naming conventions may be used in accordance with the preferred embodiments. The identifier is a user choice and is intended to fit the remote workflow conventions. Session group identifiers are expected to be consistent across sessions and to maintain equal string length for ease of tracking. A potential identifier name hierarchy is of the form <movie name><scene index><shot index><layer index>. Examples for session folder names may include "session_ToyStory3Scene07Shot023Layer1" and "session_MyLatestModel." A folder name conflict-free paradigm for session folders is of importance, and this responsibility lies under the remote site supervision. Importantly, user-specific storage techniques at their respective workstations need not be altered to conform to the preferred embodiments, because the session.xml file or other control file will provide pointers to physical data locations as necessary.

A session folder 602 is composed of an authentication control file "authen.xml", a session control file "session.xml", resource generation control files 612, and a display folder 606. The display session folder 606 is the target of final rendered images, in both interactive and batch rendering mode. The display folder stores the display control file 610 "display.xml" and the resultant frame image files 608. Frame file names may, for example, resemble the convention of a fixed prefix "frame", followed by the identifier of the session folder, and a frame index. The frame index is a zero-based count of four decimal digits (leading zeros for indices under 1000). The index implies 10000 frames per session as an upper bound. A frame display generic context provides per pixel data containing any combination of color, alpha and depth. Pixel data is split between two files—once for color and alpha and the other for depth.

The administrator folder 604 is intended for authenticating administrative tasks, amongst them batch submission. This folder contains an authentication xml file "authen.xml" and a batch control file "batch.xml."

The rrp plug-in 308 creates session folders under the exposed session's top-level folder. It then pushes the session authentication control files, the session control files, and the resource generation control files to the folder. An active session folder is one that embeds a session control file but not yet a display response folder, filled in by the rrp client 312. The rrp client 312 scans session folders and only submits active ones for remote rendering.

In interactive rendering mode the display folder 606 is created by the client but is not filled in with frame files. The display control file is written to the display folder for tracking purposes. Rather, images for display are streamed progressively directly to the rrp plug-in 308, and from there onto the rendering window of the modeling application 306. Upon a cleanly terminated session the rrp client 312 sends a summary log to the rrp plug-in 308, which responds with a status window in the modeling application 306. In batch mode frame images are always written as files, destined to the display session folder 608. The user can either retain or delete fulfilled session folders at their own pace.

The rrp client 312 provides a thumbnail and a video resolution image viewer—the latter is for display preview of final production, high-resolution images. The viewer presents the rendering results in either a stationary or an animated form.

Figures 1, 7:
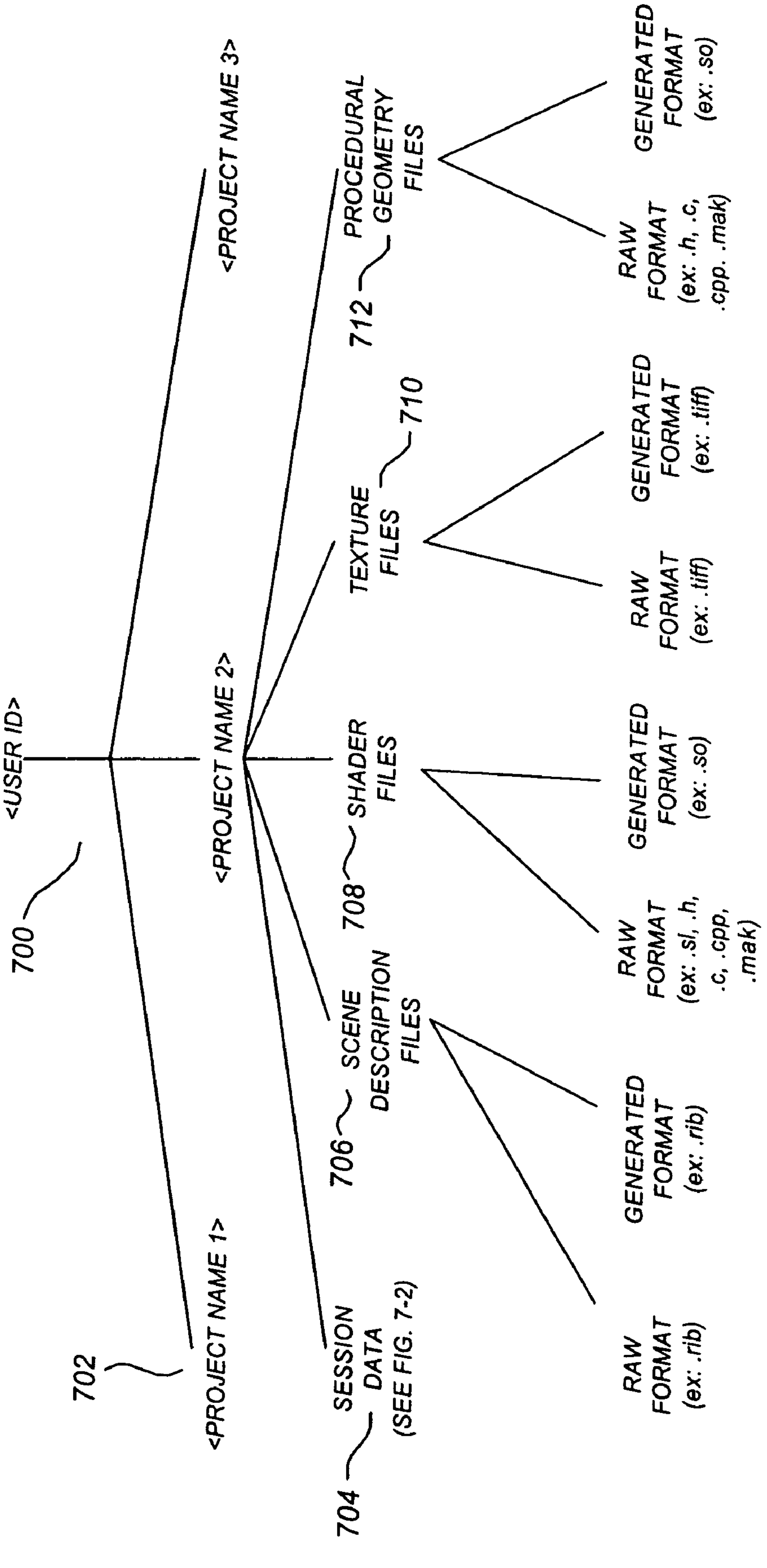
FIG. 7 shows a diagram of a rendering project storage hierarchy at a rendering service site in accordance with a preferred embodiment.
Figures 2, 7:
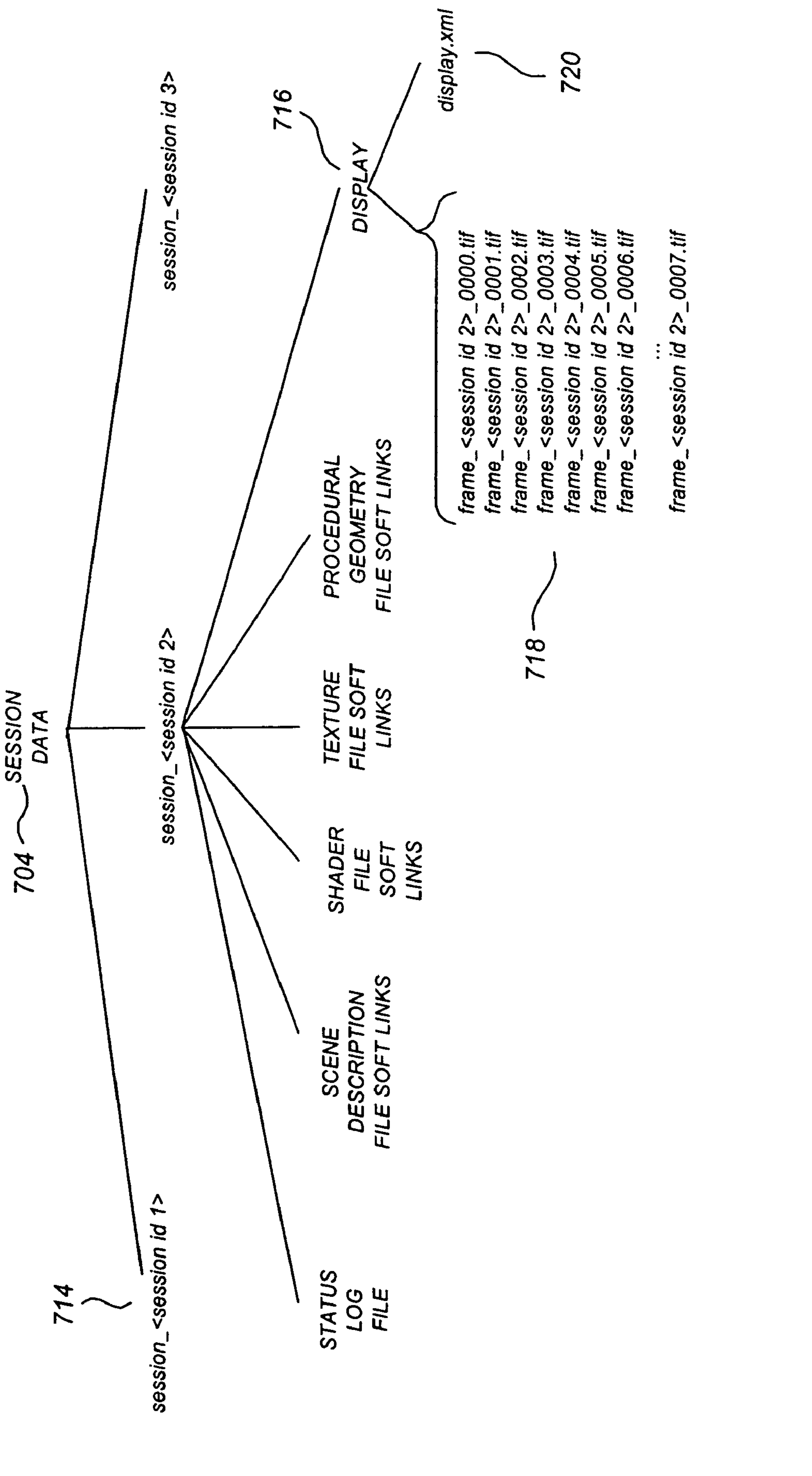

FIG. 7 shows a diagram of a rendering project storage hierarchy at the project archive 326 of the rendering service site 320 in accordance with a preferred embodiment. The rrp server 322 is associated with the project archive 326. Session uploaded data, including scene description, shader, texture and procedural files, are all destined to the project archive 326. The project archive 326 comprises a front-end project resource pool and back-end session storage nodes. The project resource pool mirrors the remote site project storage device 314 and serves as a cache of resources to be shared by all session storage nodes. In addition, the archive being a mirror preserves the original path to binded resources for both absolute and relative notation in any of the scene or shader files.

Project archive 326 comprises data grouped by user ID 700. Under each user ID is a set of project directories 702, each for a different project. For each project 702, there is a session data folder 704 for storing the session data. Every project is assigned its own scene description folder 706, shader folder 708, texture folder 710, and procedural folder 712. The scene description directory 706 stores modeling and rendering description files with all the necessary resource binding information, held in both raw and generated forms. The shader folder 708 holds all session shader files in both the raw and generated forms. Both natural and procedural textures are kept in the texture folder 710, in both the raw and the generated forms. Similarly, procedural geometry folder 712 holds procedural geometry files in both their source and dynamically loadable (generated) version.

Raw resource files uploaded from the client site are destined in to the raw sub-folder, first. Essentially, a raw resource relates to its source. Raw resources are subject to a conversion process, which will fit them to the expected rendering system interface. This process involves one of scene description conversion or incremental merge, shader compilation, texture generation for any of 2D, 3D, environment and bump, and finally procedural geometry dynamic library creation. Scene descriptions, shaders and procedurals assume an implicit generation process in most cases. The making of textures nevertheless, is particular and unique to a session and involves creation parameter variations. The rrp provides a generic mechanism to accommodate a customized generation process by means of resource generation description files. The rrp server 322 parses these files and applies making parameters to a single or a group of resources, of the same type. Resource description files are much like a "make" file for creating objects from raw sources.

Examples of resource generation control file formats are depicted in Appendices D-F. The presence of a scene description generation control file indicates a need to generate a scene resource to the expected renderer format. Shader and procedural resource generation control files group any number of rendering resources, each governed by a make file resource. Objects generated off the source are expected to be linked to libraries, which already reside on the rendering service site. The absence of a "make" file in a resource generation control file implies default generation. The texture generation file parameters include input group of image files, output texture file, component conversion, type, sub type, mode and filter for each dimension. The generated rendering resources reside in the "generated" sub-folders of FIG. 7. Resources under the same directory share the same name space, therefore file name conflict must be avoided.

Session data folder 704 comprises one or more individual session storage nodes 714. Each storage node 714 is directly related to the session ID allocated. The session ID uniquely identifies each session storage node 714. The physical mapping of the session ID on to a file system location is embedded in the session attribute set, which is registered into the rrp administrative database 328 at upload time (discussed further with respect to FIG. 8). Each session storage node 714 is unfolded to a six-way construct of status, scene, shader, texture, and procedural subfolders, as well as display subfolder 716. The scene server 330 reports rendering progress, rendering timing and exceptions into a status log file shown in FIG. 7. The scene, shader, texture and procedural folders contain soft links to the project resource pool. Finally, the scene server 330 deposits a session's rendered images into the display location 718. The display folder 716 thus comprises a display.xml file 720 and the rendered frame data 718.

Figure 8:
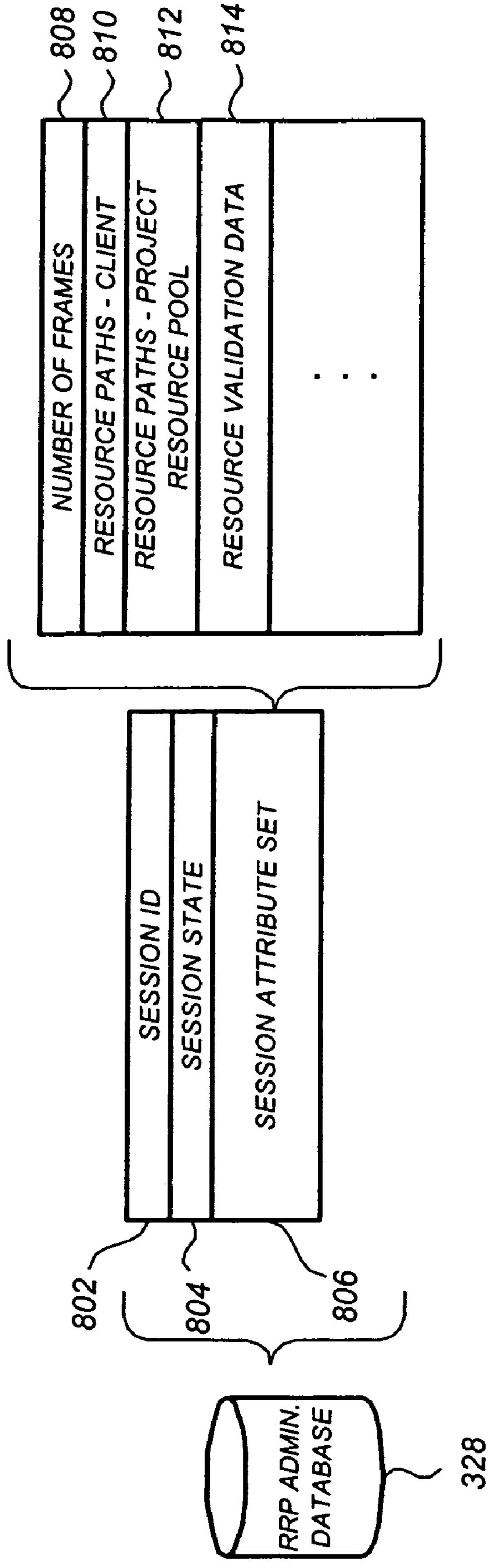
FIG. 8 shows a diagram of a remote rendering protocol administrative database at the rendering service site in accordance with a preferred embodiment.

FIG. 8 shows a diagram of the remote rendering protocol administrative database 328 at the rendering service site 320 in accordance with a preferred embodiment. The rrp administrative database stores a plurality of records organized by session ID 802. For each session ID, there is a session state parameter 804 and a session attribute set 806. Session attribute set 806 comprises data describing the session and its results, which is amenable for later searching. By way of example, session attribute set 806 includes the number of frames 808, client-side resource paths 810, project resource pool resource paths 812, and resource validation data 814.

Figure 9:
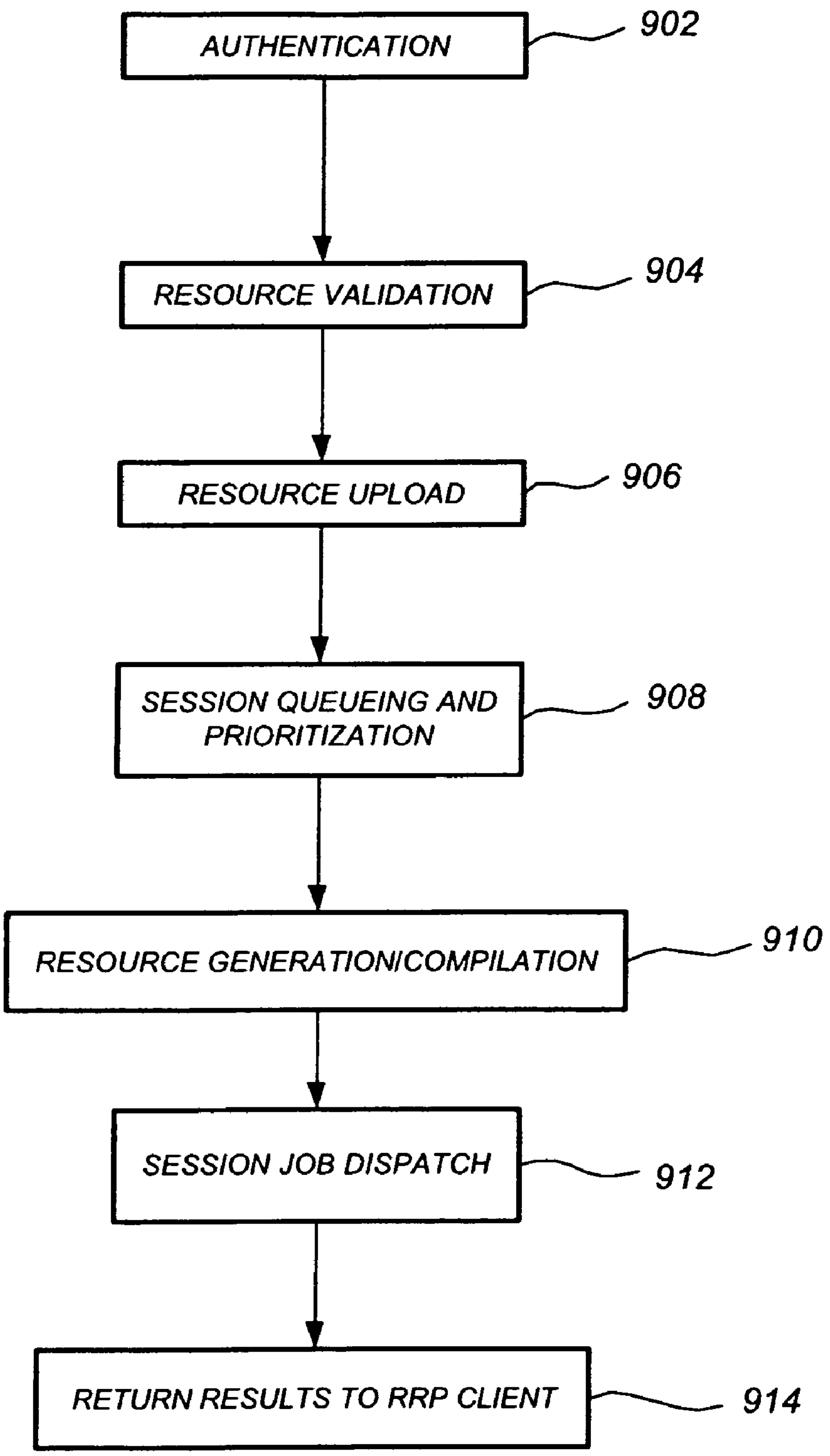
FIG. 9 shows overall steps taken by a remote rendering protocol server in accordance with a preferred embodiment.

FIG. 9 shows overall steps taken by the remote rendering protocol server 322 in accordance with a preferred embodiment. FIGS. 10-14 describe the individual steps in greater detail. Most generally, at step 902, a client authentication request is received and processed. At step 904, rendering resources in the project resource pool are validated, i.e. checked against the current versions of the rendering resources on the client side local project storage device 314 to determine if they are still current. At step 906, invalid raw rendering resource files are uploaded from the client site. At step 908, the session is queued and prioritized. At step 910, which may occur at different times in the process, it is determined which resources require generation/compilation, and the generation can occur at the rrp server 322, at the scene server 330, at the rendering engine 332 (in a background process), or at another node sometime before session job dispatch (step 322). At step 914, results are returned to the rrp client 312.

Figure 10:
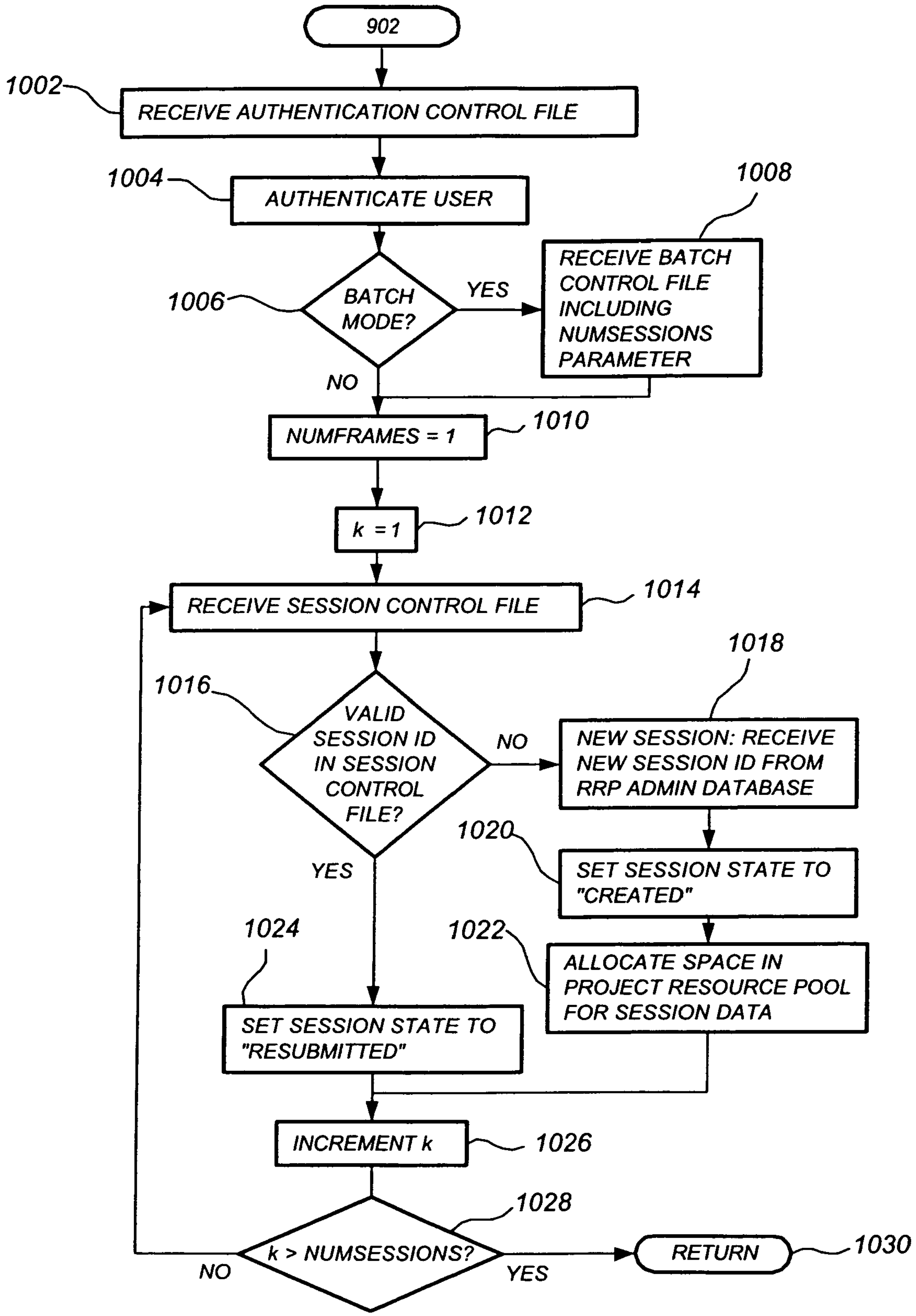
FIG. 10 shows steps corresponding to an authentication step of FIG. 9.

FIG. 10 shows steps corresponding to the authentication step 902 taken by the remote rendering protocol server 322. At step 1002, the rrp server 322 site receives a client authentication request in the form of an authen.xml file. If the user selects batch mode at step 1006, the batch control file batch.xml is received, which includes the number of sessions in the batch. A sample of a batch control file is provided in Appendix H, infra. For each session in the batch (steps 1010, 1012, 1026, and 1028), the session control file is received (step 1014) and it is determined, by comparison with the rrp administrative database 328, whether a valid session ID already exists. If not, then it is a new session and a new session ID is assigned by the rrp administrative database 328 (step 1018). At step 1020, the session state 804 is changed to "created," and at step 1022 space is allocated in the project resource pool for the session data. However, if there is already a valid session ID in the session control file, then it is a resubmitted job, no new session ID is created, and space in the project resource pool is simply reused. At step 1024, the session state 804 is set to "resubmitted."

A session life span is marked with unique state instances, stored in the rrp administrative database 328 at session state location 804. The generation of a session ID registers a session as "created." It then proceeds through an "uploaded" state to indicate ready for rendering. Submitting a rendering job marks the session as "submitted," once acknowledged by the scene server. When final rendered images have been stored in the project archive node the session is marked as "rendered." Rendered images reaching the client indicate a "notified" session. A "resubmitted" session conducts itself through a resubmitted, rendered and notified states. Finally, a session, which has been eventually removed from the archive, is marked "expired."

With regard to step 1024, a session control file providing a valid session ID indicates a session already submitted in the past, most likely with only minor modifications. It is assumed that a session resubmitted is currently in either notified or expired state. The rrp server 322 searches for the designated project resource pool archive session node and will mark the non-expired session state as resubmitted. A session node is expected to persist in the project archive for a finite duration of time. Once expired the session will have to be reassigned a session ID and evolve its life span from creation. A session resubmit, implies the equivalent resource validation of a newly submitted session, but statistically with less thrashing. Session node storage is reclaimed in the case of resubmitting. The status and display sub-folders of the session storage node are cleaned up prior to job submission.

Figure 11:
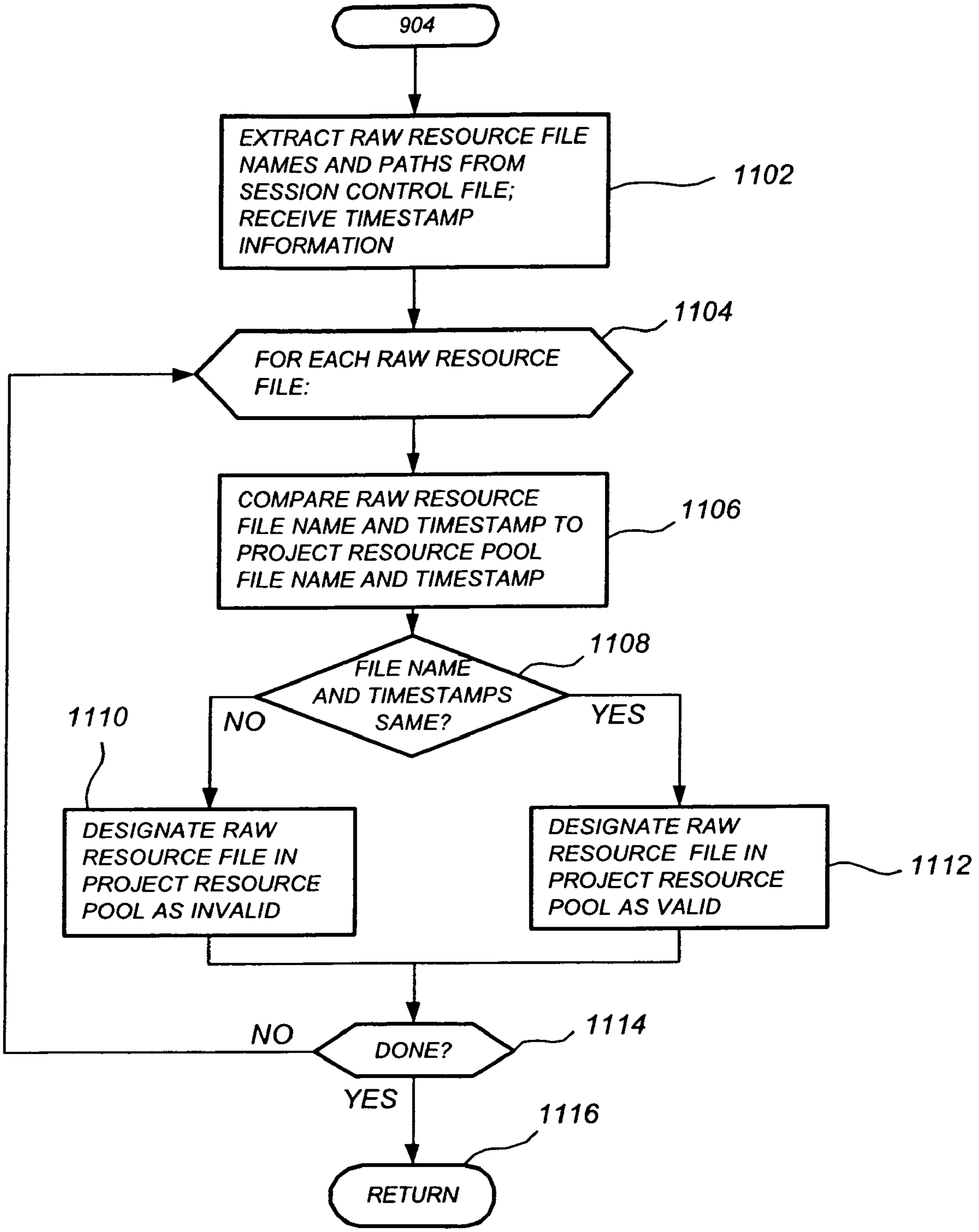
FIG. 11 shows steps corresponding to a validation step of FIG. 9.

FIG. 11 shows steps corresponding to the validation step 904 taken by the remote rendering protocol server 322. At step 1102, raw resource file names and paths are extracted from the session control file, and timestamp information is also provided in conjunction with the session control file, and thereby the current contents of the client side local project storage device 314 are received. For each raw resource file (steps 1104 and 1114) the file name and timestamp in the project resource pool are compared to these raw resource file names and timestamps from the session control file. If there is a match, then the raw resource file is valid (step 1112), and if not the raw resource file is invalid (step 1110). Importantly, although FIG. 11 shows a timestamping procedure, it is to be appreciated that many different validation methods, including for example a content comparison of the project resource pool files against the client side files, are within the scope of the preferred embodiments.

Figure 12:
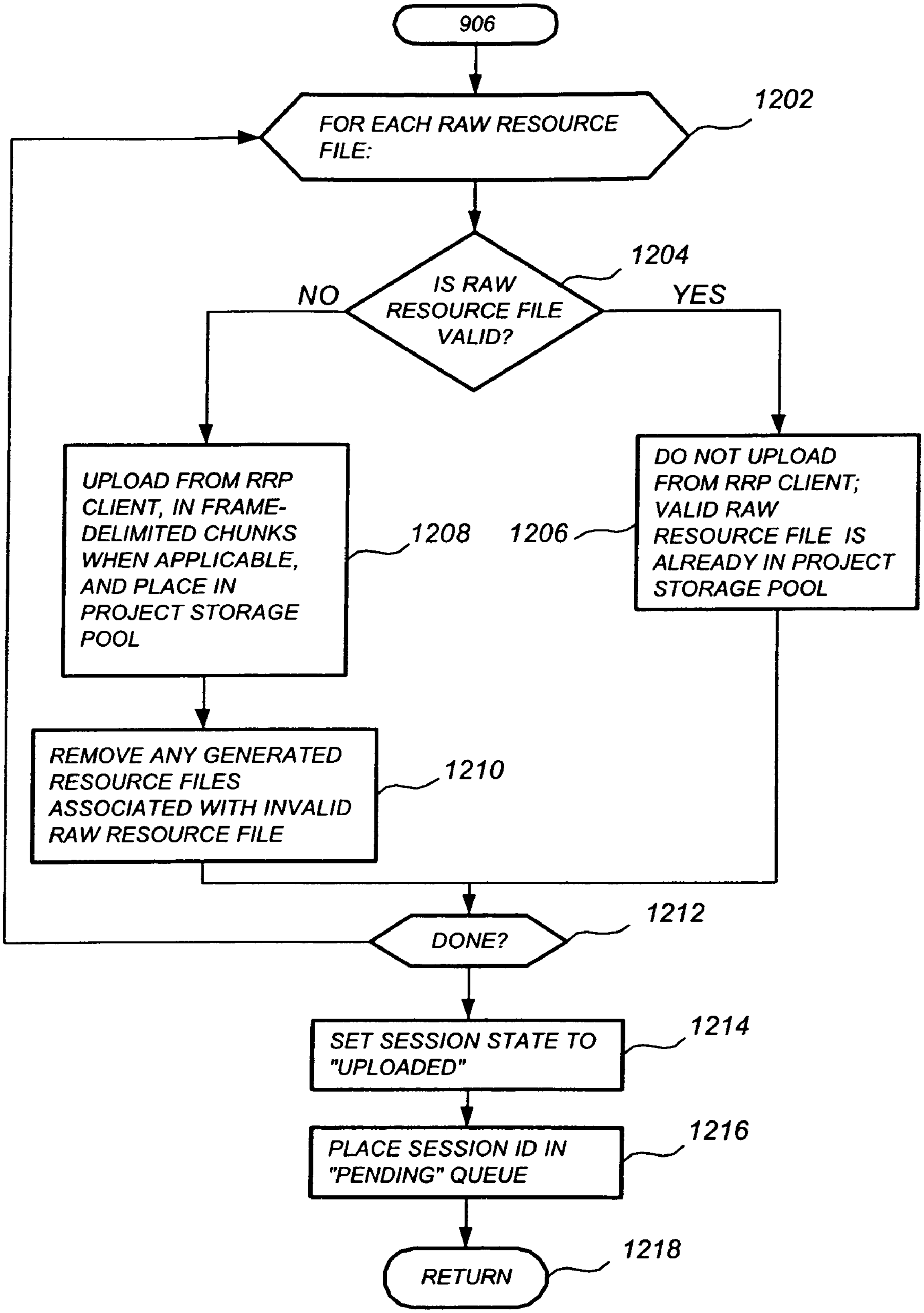
FIG. 12 shows steps corresponding to a resource upload step of FIG. 9.

FIG. 12 shows steps corresponding to the resource upload step 906 taken by the remote rendering protocol server 322. For each raw resource file identified in the session control file (steps 1202, 1212), if the raw resource file is valid then at step 1206 the raw resource file is not uploaded from the rrp client 312, as the cached version is still valid. However, if invalid, then at step 1208, the file is uploaded from the rrp client 312, preferably in frame-delimited chunks where applicable, and placed in the project storage pool. Resource chunking, for the sake of network transfer efficiency, benefits caching as well. Frame granularity scene description files are essentially considered as a cache line. A cache line is validated once the copy of the frame on the rrp server side is out-dated. In addition, scene description files kept to a frame size in scope, provide a streamlined pipeline for rendering to commence as scene files are uploaded. Tiled tiff textures benefit the storage on the rendering side by reducing the memory footprint—only accessed tiles are downloaded to the rendering system. Also, texture access for filtering is significantly improved in a localized texture tile.

Throughout session upload time, metadata are inserted into the rrp administration database 328 to form session attribute set 806. The attribute set mostly includes tag information extracted of the session control xml file. Session attribute set data may be used for later monitoring, billing and mining tasks. Optionally, at step 1210 any generated resource files associated with the invalid raw resource file are removed from the project resource pool. At step 1214, the session sate is changed to "uploaded", and at step 1216 the session ID is placed in a "pending" queue of the rrp server 322.

A session job is passed along with the file system path of a project resource pool archive node 702. Essentially, the rrp server 322 deposits a single top-level scene description file into the session scene sub-folder. The top-level scene file includes all the dynamic scene file references of the session and prescribes a project resource pool search path for each of the scene, shader, texture and procedural resources. The scene server 330 acknowledges the receipt of a session job and commences rendering starting with the retrieval of scene description and resources off the designated archive node area. The rrp server 322 maintains a pair of job queues for both "pending" and "submitted" jobs to allow for flow control measures. The queue's priority is based on billing attributes associated with the session, mostly indicating the execution promptness of the session (step 908). In order to strike a reasonable balance across pending jobs, session might be broken to a subset of frames, e.g. the scene server 330 might be informed to conduct rendering in between frame index delimiters. Further disclosure related to the rendering request interface between the rrp server 322 and the scene server 330 are detailed in Appendix G infra.

Figure 13:
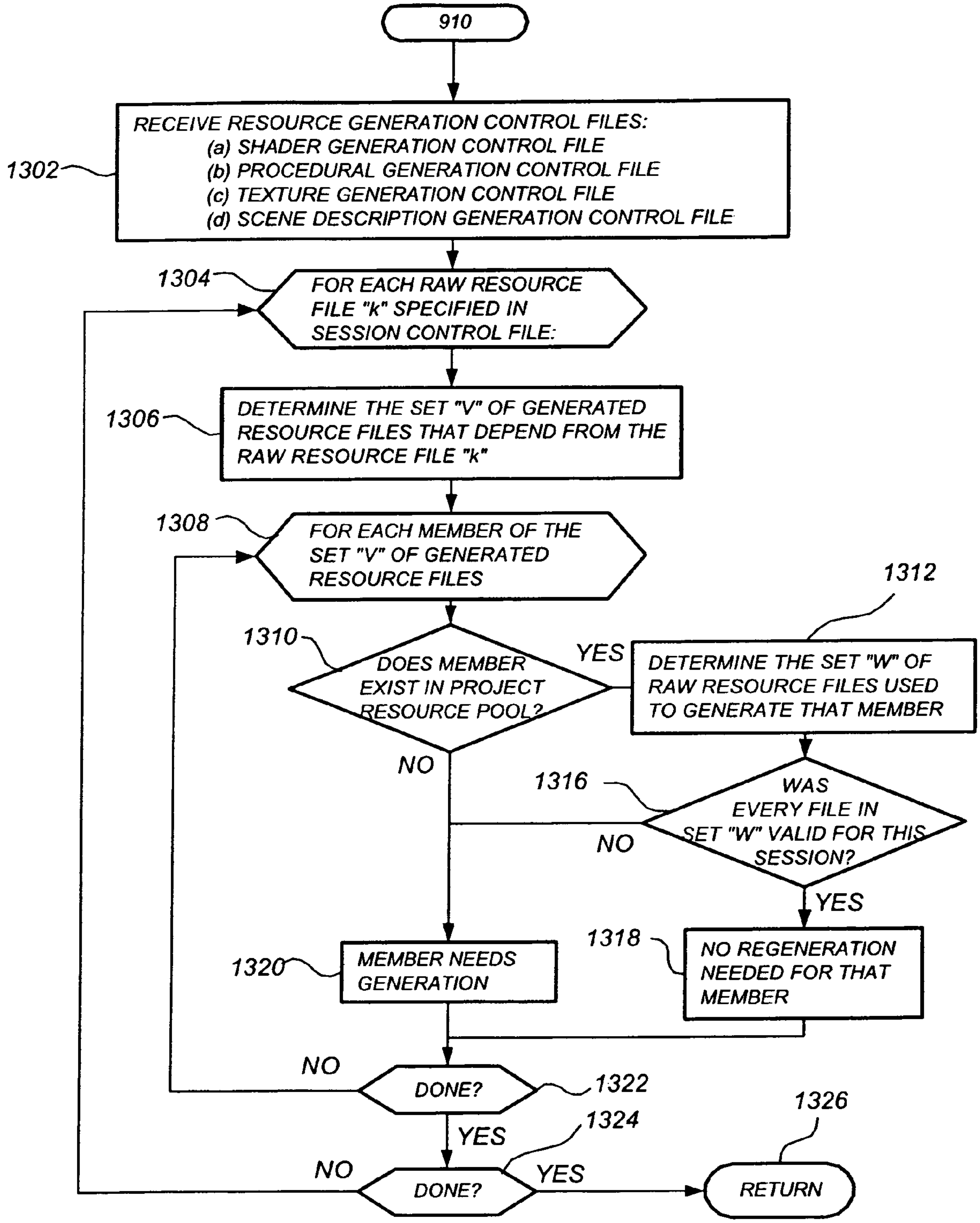
FIG. 13 shows steps corresponding to a resource generation validation step of FIG. 9.

FIG. 13 shows steps corresponding to a resource generation validation step 910 taken by the remote rendering protocol server 322. In accordance with a preferred embodiment, the rrp server 322 engages in comprehensive checking and cross-checking as described herein to reduce redundant resource generation. It is to be appreciated that while some computing expense is incurred by these steps, it is often negligible when compared to the substantial computing time dedicated to even a single unnecessary resource generation operation. In a simplest scenario (not shown in FIG. 13) according to a preferred embodiment, it is assumed that a single raw resource file is associated with a single generated resource file, in which case it is easy to detect which raw files need generation—it would simply be those raw resource files that were invalid during the resource validation step 904. However, in FIG. 13 a more complicated superset of this scenario is assumed, wherein pluralities of raw rendering resource files may correspond to pluralities of generated rendering resource files in the project resource storage pool, as dictated by the resource generation control files 612 transmitted with the rendering request.

Thus, at step 1302, the resource generation control files 612 are received, containing a mapping (from which both forward and reverse mappings can be derived) between raw resource files and generated resource files. In accordance with a preferred embodiment, redundant generation of raw resource files is avoided by performing the following steps. For each raw resource file "k" specified in the session control file (steps 1304, 1324), a forward-mapping of the raw rendering resource file "k" onto a set V of dependent generated rendering resource files is made using the resource generation control files (step 1306). For each member of the set V (steps 1308, 1322), it is first determined whether that member exists in the project resource pool (step 1310). If not, then at step 1320 that member is identified as requiring generation. If that member is in the project resource pool, then at step 1312 it is reverse-mapped (step 1312) onto a set W of raw rendering resource files, again using the resource generation control files. At step 1316, it is determined whether every file in the set W was valid during the resource validation step 904 supra. If not, then at step 1320 that member is identified as requiring generation. If so, then that member is identified as not needing generation at step 1318. The actual process of generating those files being so identified as needing generation may actually be performed in any of a variety of ways, e.g., by the rrp server 322 itself, by another node, by the scene server 330 and/or rendering engine 332 in a background polling process, and so on. Texture resource making is an expensive process. Alternatively, one possible form of texture making caching is to record the latest texture make parameters in the rrp administration database 328. A new texture make request is avoided unless generation parameters have been changed since last recorded or input image files required validation recently.

Figures 1, 14:
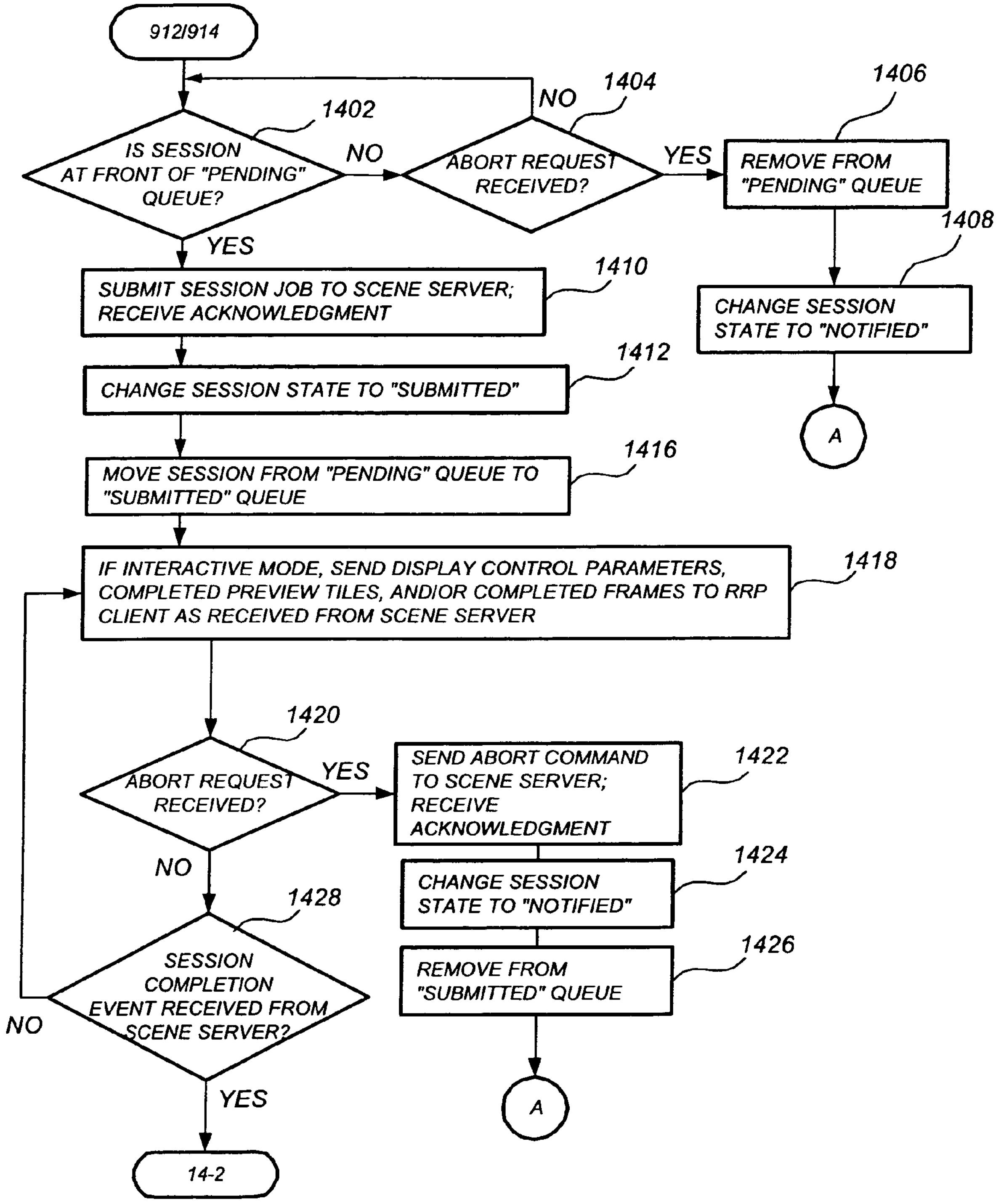
FIG. 14 shows steps corresponding to job submission, monitoring, and return steps of FIG. 9.
Figures 2, 14:
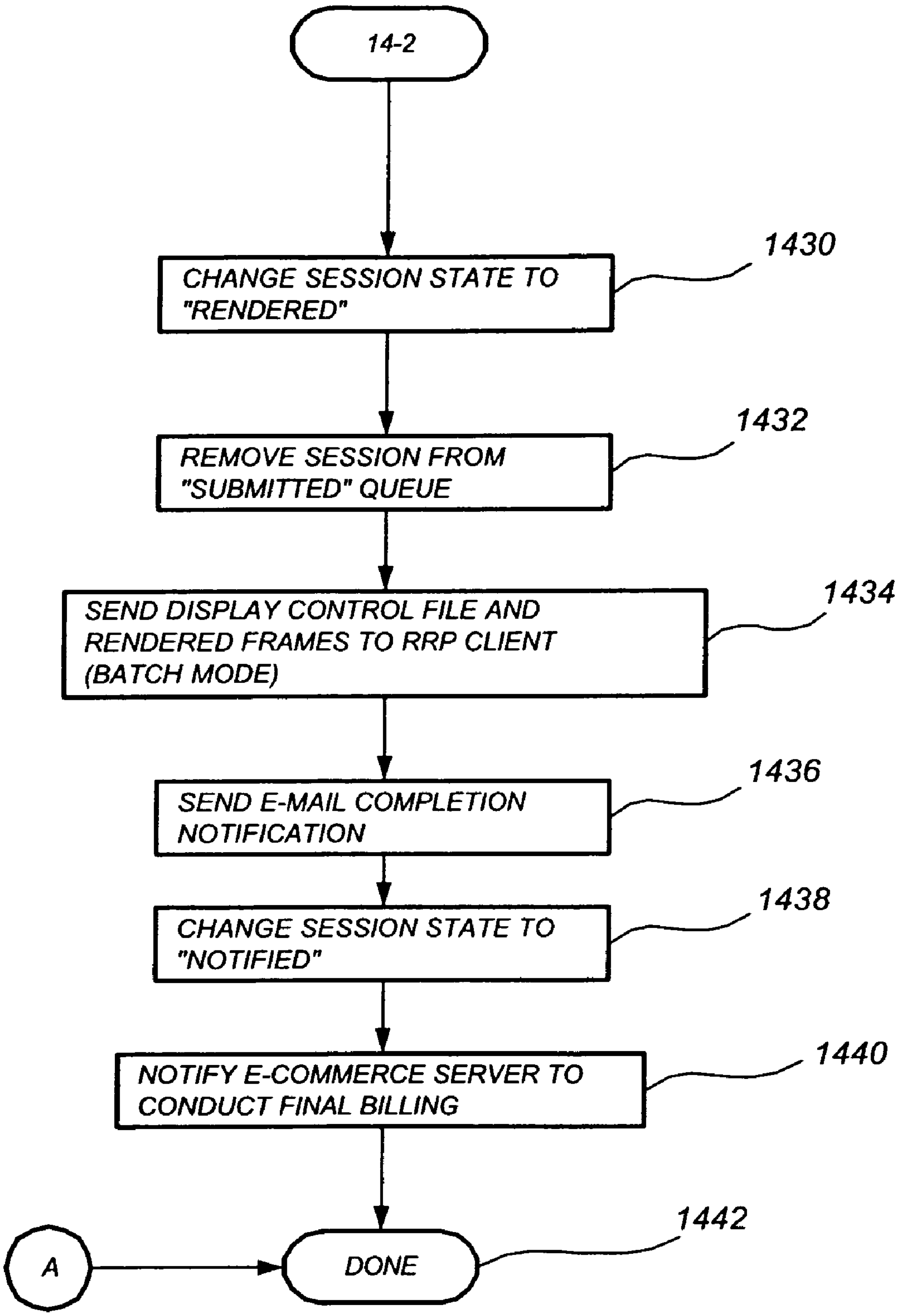

FIG. 14 shows steps corresponding to job submission step 912, monitoring, and results return step 914 taken by the remote rendering protocol server 322. The session will most often simply be idling in the "pending" queue of the rrp server application 322, unless an "abort" request is received from the rrp client 312 (steps 1402-1404). If such an abort request is received, then at step 1406 the session is removed from the pending queue and its session state 804 is changed to "notified." Upon reaching the front of the pending queue, the session job is submitted to the scene server 330 (step 1410) and an acknowledgment is received. The session state 804 is changed to "submitted" at step 1412, and at step 1416 the session is moved from the pending queue to the "submitted" queue. If an interactive mode session, the display control file, completed preview tiles, and/or completed frames are sent to the rrp client 312 as the rendered frames are received from the scene server 1418. The rrp server 322 will either download final rendered images or a scaled down version, once a session requested the display preview option. In display preview, high-resolution images are converted into a canonical video format prior to the download. In the preview mode all channel data will be converted down to 8 bits. The client follows with a high-resolution display request or simply dismisses rendering results all together. A frame depth file—once present—is scaled down to the proper preview resolution, however, depth values are retained to their full dynamic range.

If an abort request is received at step 1420, the abort command is sent to the scene server and an acknowledgement received (step 1422), the session state 804 is changed to "notified" (step 1424), and the session job is removed from the submitted queue (step 1426). The process continues until a session completion event is received from the scene server (step 1428), at which point the session state 804 is changed to "rendered" (step 1430), the session job is removed from the submitted queue (step 1432), the display control file and rendered frames are sent to the rrp client 312 if batch mode (step 1434), an e-mail completion notification is sent (step 1436), the session state is changed to "notified" (step 1438), and the e-commerce server 334 is notified to commence final billing (step 1440).

Figure 15:
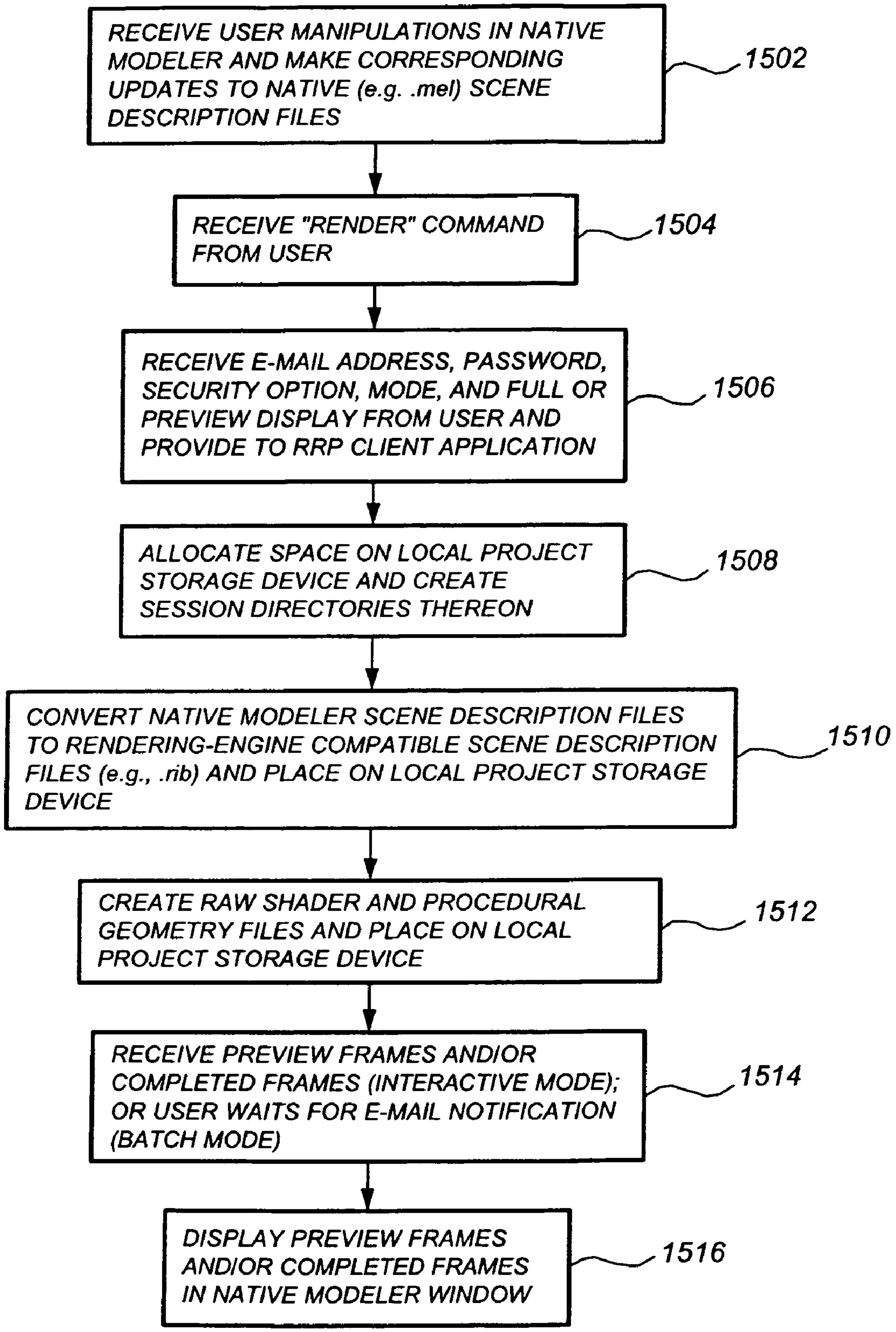
FIG. 15 shows steps taken by a remote rendering protocol plug-in in accordance with a preferred embodiment.

FIG. 15 shows steps performed by remote rendering protocol plug-in 308 in accordance with a preferred embodiment. At step 1502, user manipulations in the native modeler are received, and updates to corresponding native scene description files (e.g., .mel files) are made. At step 1504, a render command is received from the user. At step 1506, the e-mail address, password, security options, mode, and full or preview display parameters are received from the user and provided to the remote rendering protocol client application 312. At step 1508, space is allocated on logical local project storage device 314 and session directories are created thereon. At step 1510, native modeler scene description files are converted to rendering engine compatible scene description files (e.g., .rib files). At step 1512, raw shader and procedural geometry files are created and placed on the local project storage device 314. Following this step, the remote rendering protocol client application 312 performs steps described infra with respect to FIG. 16. At step 1514, preview frames and/or completed frames are received if in the interactive mode, or else the user awaits for e-mail notification in the batch mode. At step 1516, the preview frames and/or completed frames are displayed in the native modeler window.

Figure 16:
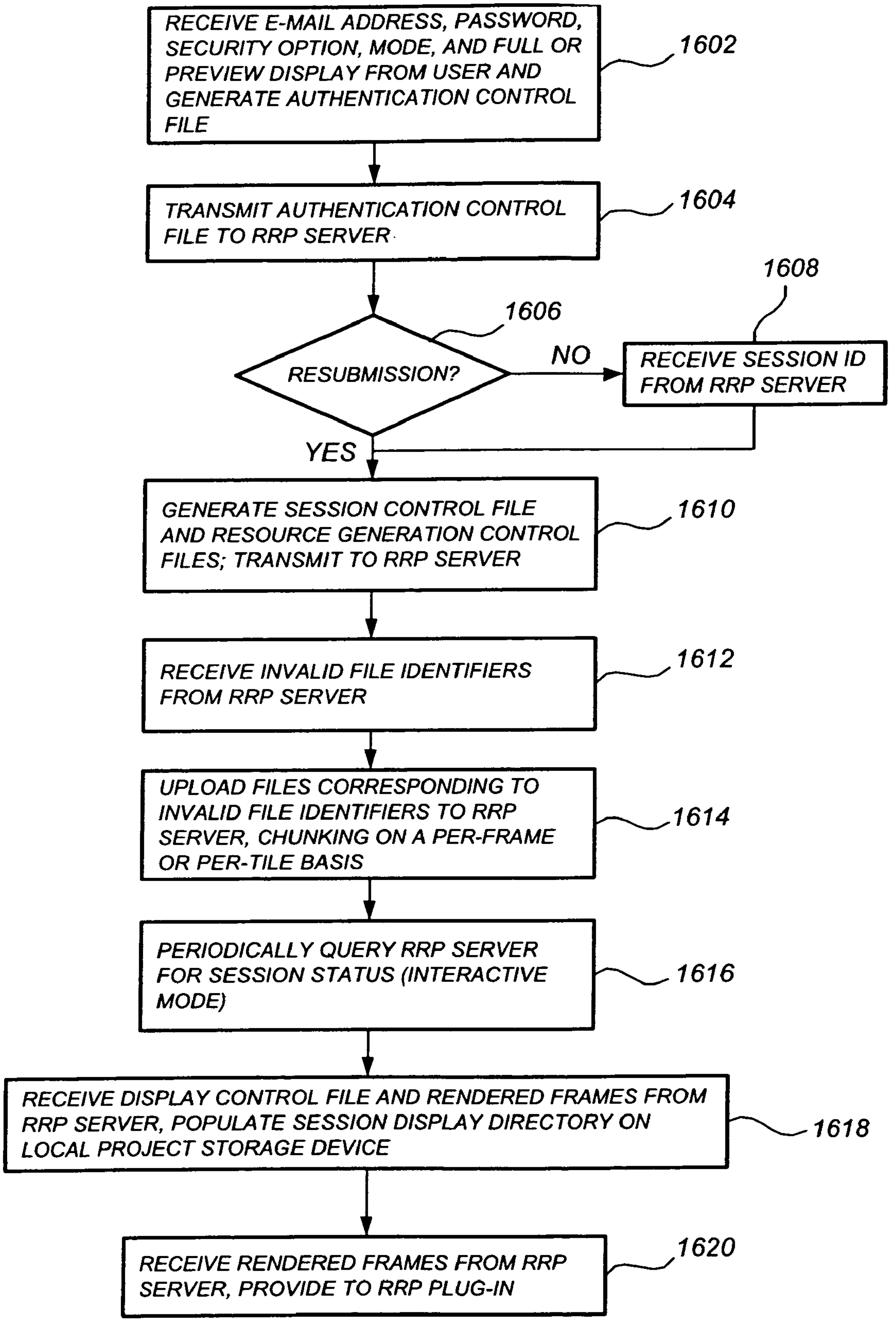
FIG. 16 shows steps taken by a remote rendering protocol client application in accordance with a preferred embodiment.

FIG. 16 shows steps performed by remote rendering protocol client application 312 in accordance with a preferred embodiment. At step 1602, session workflow parameters are received from the remote rendering protocol plug-in 308 from which the authentication control file is created. At step 1604, the authentication control file is transmitted to remote rendering protocol server 322 over the Internet or other wide area network. If at step 1606 the job is a resubmission, then the session ID is already known. If the job is not a resubmission, a session ID is received from the remote rendering protocol server 322 at step 1608. At step 1610, a session control file and resource generation control files are created and transmitted to the remote rendering protocol server 322. At step 1612, invalid file identifiers are received from the remote rendering protocol server 322, and at step 1614, these files are uploaded from the client site to the remote rendering protocol server 322, preferably being chunked on a per frame and/or per tile basis. At step 1616, the remote rendering protocol server 322 is periodically queried (interactive mode). At step 1618, a display control file and rendered frames are received from the remote rendering protocol server 322, in the appropriate session display directory on the local project storage device 314 is populated with the data. At step 1620, the remote rendering protocol plug-in 1620 is actuated within the native modeler based on the received data.

Figure 17:
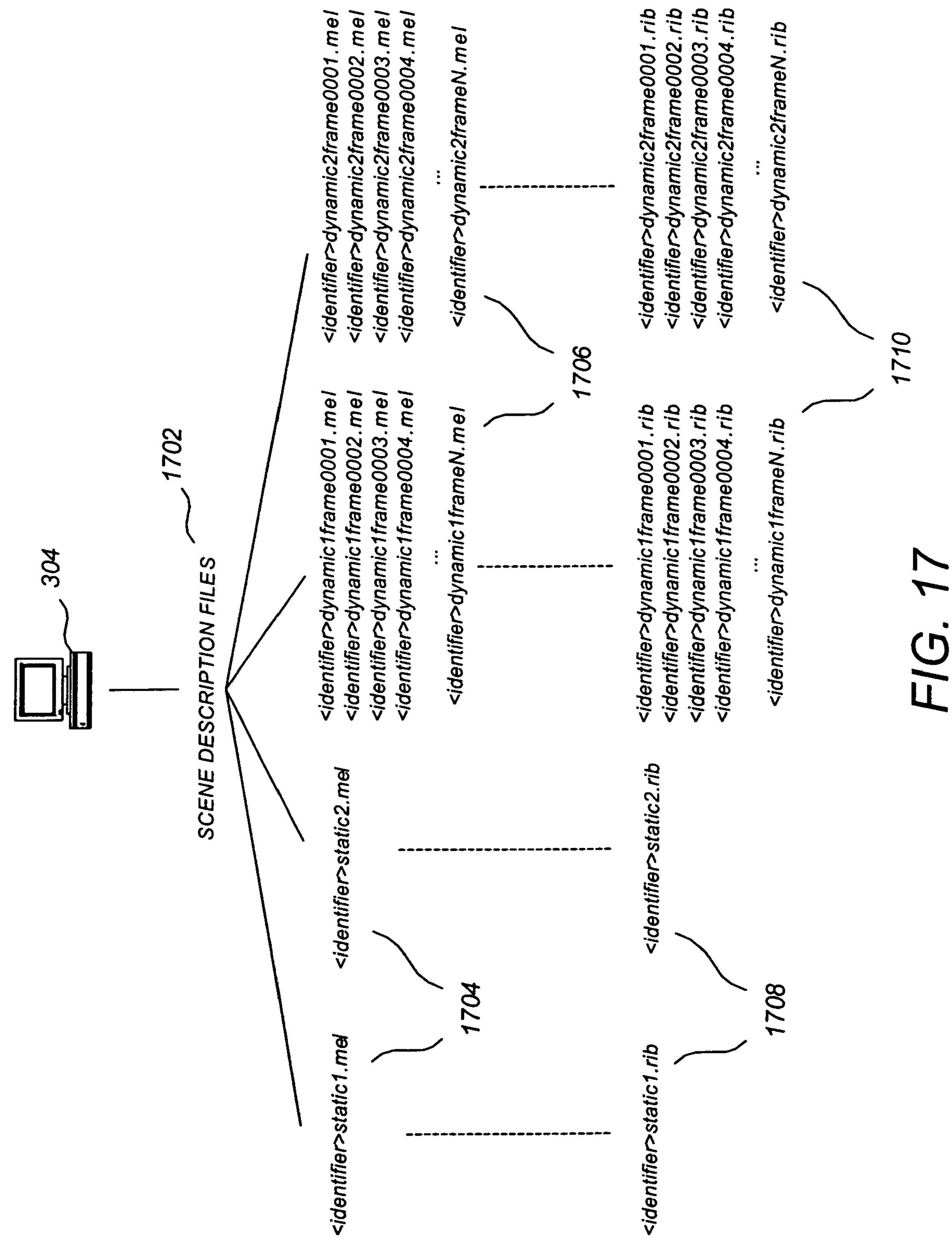
FIG. 17 shows a conceptual diagram of static and dynamic scene description files created using a modeling application in accordance with a preferred embodiment.

FIG. 17 shows a conceptual diagram of static and dynamic scene description files created using a modeling application in accordance with a preferred embodiment. In accordance with another preferred embodiment, a method for interfacing with a modeling program such as Maya, Lightwave, or the like is provided, comprising the steps of manipulating the modeling program such that the scene description is modularized into at least one static scene description file and one dynamic scene description file. Shown in FIG. 17 is a client computer 304, together with first and second static scene description files 1704, and with first and second groupings of dynamic scene description files 1706, in their native formats (e.g., .mel to correspond to Maya). Also shown in FIG. 17 is the first and second static scene description files 1708, and first and second groupings of dynamic scene description files 1710, in formats compatible with the rendering engine of the rendering service (e.g., rib to correspond to RenderMan). The conversion from native formats to rendering service engine formats is performed by the rrp plug-in 304.

In accordance with a preferred embodiment, the static scene description files 1704 contain geometries and other primitives that generally do not change among successive frames of a session, while the dynamic scene description files 1706 contain geometries and other primitives that do change among successive frames of a session. When a rendering request for the session is submitted in accordance with the above protocol, a statistically fewer number of rendering resource files will be uploaded to the rendering service because the static scene description files will be constant across many frames and therefore not uploaded for those frames. Methods for generation of static and dynamic scene description files can be found, for example in "Learning Maya," Alias|Wavefront Education Publishing (2000), for the Maya modeler, and "LightWave—Shape: Model, Surface & Light," NewTek, Inc. (2000) for the Lightwave modeler.

By way of non-limiting example, it has been found that the above modularization of scene descriptors can lower the volume of scene descriptions per session from about 2 GBytes if non-modularized, to about 50 MBytes modularized. Thus, a coarse delta-modulation effect takes place, such that only frame-over-frame changes are communicated to the rendering service, resulting in a savings of both bandwidth between the client site and rendering service site, as well as a savings of generation resources at the rendering service site. Session scene description files on the remote site are preferably modularized on a per-object basis. A modified object by the application impacts only a small subset of the session scene description files and hence requires far less resource validation. In many cases only global rendering parameters are modified across iterative sessions. In this case the global scene file is the only item to be validated leaving the rest of the resource in tact and readily available for rendering on the rendering service side.

Secure Internet communications is also provided by the rendering service. Rendering resources are very dear to users in animation studios, where innovation and creativity play significant role. The rrp implements Secure Sockets Layer (SSL) and Transport Layer Security (TLS) protocols and includes functionality for data encryption, server authentication, message integrity, and optional client authentication. Passage of rendering control and resource data are passed securely between the client and the server using an HTTP protocol over TCP/IP. The cryptographic suites listed in Table 1 below are supported:

TABLE 1

| Cryptographic Suites Supported Domestic and Global | |
|---|---|
| Cryptographic Suite | Key Length |
| RSA public key (authentication and key agreement) | 2048 bits (authentication), 2048 bits (key agreement) |
| RC4 (bulk encryption) | 128 bits |
| DES (bulk encryption) | 64 bits (56 effective) |
| Triple DES (bulk encryption) | 192 bits (112 effective) |
| Diffie-Hellman public key (key agreement) | 1024 bits |
| DSA public key (authentication) | 2048 bits |

With regard to data compression, network bandwidth appears to be a scarce resource and trading off traffic quanta and processing power is very valid. Compression techniques are preferable in both the imagery and geometry spaces. The lossless nature of any compression scheme devised is a probably prerequisite in the market. The incentive for image compression is mostly geared towards texture uploads and somewhat less so for display image downloads. A rather conventional project flow anticipates texture validation to be fairly dominant at the early stages of a project. Past a certain point in the project life span upload weight is shifted towards scene and shader resources and texture traffic is significantly reduced. Nevertheless, improving upload efficiency at project early phase is important enough (especially to a new service adaptor) to have compression embedded in the service from its inception. A lossless compression technique, of course, is expected to yield a fairly mild reduction factor. A tiff file format using run-length encoding technique is preferable. Run length encoding is especially beneficial for large dynamic range color components (16 bits or float).

Deformed geometry is playing a major role in character animation based movies. The resultant per-frame scene files are rather big—several tens of MBytes. Despite the use of high level primitives (e.g. nurbs, subdivision surfaces), a facial object still uses a fairly large number of patches. Known geometry compression schemes are level-of-detail based and imply multi-resolution. Multi-resolution techniques may be useful in interactive mode and renderers like RenderMan already support this convention. Inter-frame geometry compression techniques as devised by MPEG4 are also preferred.

APPENDIX A

Sample Authentication Control File

```
<?xml version="1.0"?>
<!-- sample implementation file -->
<!DOCTYPE AuthenControl
[
<!ELEMENT PartnerEmail (#PCDATA)>
<!ELEMENT PartnerPswd (#PCDATA)>
<!ELEMENT SessionSecured (#PCDATA)>
<!ELEMENT BatchMode (#PCDATA)>
<!ELEMENT Application (ApplicationName, ApplicationId)>
```

APPENDIX A-continued

Sample Authentication Control File

```
<!ELEMENT ApplicationName (#PCDATA)>
<!ELEMENT ApplicationId (#PCDATA)>
]>
<AutenticationControl>
<PartnerEmail>ILM</PartnerEmail>                 // or user email address
<PartnerPswd> . . . </PartnerPswd>               // or user password in interactive mode
<SessionSecured>false</SessionSecured>           // a 'true' tag indicates a fully secured session
<BatchMode>false</BatchMode>                     // a 'true' tag indicates batch (pull) mode
<Application>
<ApplicationName>Maya</ApplicationName>          // application name
<ApplicationId>10.10.20.345</ApplicationId>      // application host ip address
</Application>
</AuthenticationControl>
```

APPENDIX B

Sample Session Control File

A sample of the session control xml file is illustrated. Upload order of resources is implied by the appearance in the xml file. Resource path is indicated in the attribute list of the DTD header, resource file names are associated with the tags.

```
<?xml version="1.0"?>
<!-- session control file -->
<!DOCTYPE SessionControl
[
<!ELEMENT SessionControl (Header, Session, Resource, Display)>
<!ELEMENT Header (Comment, Date, PartnerId, ProjectName)>
<!ELEMENT Comment (#PCDATA)>
<!ELEMENT Date (#PCDATA)>
<!ELEMENT PartnerId (#PCDATA)>
<!ELEMENT PartnerPswd (#PCDATA)>
<!ELEMENT ProjectName (#PCDATA)>
<!ELEMENT Session (SessionName, SessionId, SessionPrompt, NumFrames)>
<!ELEMENT SessionName (#PCDATA)>
<!ELEMENT SessionId (#PCDATA)>
<!ELEMENT SessionPrompt (#PCDATA)>
<!ELEMENT NumFrames (#PCDATA)>
<!ELEMENT Resource (Scene, Shader, Texture)>
<!ELEMENT Scene (SceneResource)>
<!ELEMENT SceneResource (#PCDATA)>
<!ATTLIST SceneResource Path CDATA #FIXED "D:\believe\sessions\session__motion\scenes">
<!ELEMENT Frame (SceneResource)>
<!ELEMENT Shader (ShaderResource)>
<!ELEMENT ShaderResource (#PCDATA)>
<!ATTLIST ShaderResource Path CDATA #FIXED "D:\believe\sessions\session__motion\shaders">
<!ELEMENT Texture (TextureResource)>
<!ELEMENT TextureResource (#PCDATA)>
<!ATTLIST TextureResource Path CDATA #FIXED "D:\believe\sessions\session__motion\textures">
<!ELEMENT Procedural (ProceduralResource)>
<!ELEMENT ProceduralResource (#PCDATA)>
<!ATTLIST ProceduralResource Path CDATA #FIXED "D:\believe\sessions\session__motion\procedurals">
<!ELEMENT Display (DisplayPath, DisplayPreview)>
<!ELEMENT DisplayPath (#PCDATA)>
<!ELEMENT DisplayPreview (#PCDATA)>
]>
<SessionControl>
<Header>                                                  // general info about the remote site
<Comment>Believe Remote Rendering Service</Comment>
<Date>Thursday,Jan. 11,2001</Date>
<PartnerId>ILM</PartnerId>                                // or user id
<ProjectName> . . . </Projectname>                        // project name - session parent
</Header>
<Session>
<SessionName>ToyStory3Scene05Shot027</SessionName>        // session unique identifier string
<SessionId></SessionId>                                   // a valid token indicates resubmit
<SessionPriority>2</SessionPriority>                      // session priority (applicable in batch mode)
```

-continued

```
<SessionPrompt>ASAP</SessionPrompt>          // level of session execution promptness (billing)
<NumFrames> . . . </NumFrames>               // number of frames in the session
</Session>
<Resource>
<Scene>
<SceneResource> . . . </SceneResource>       // static scene description file names
. . .
<SceneResource> . . . </SceneResource>
<Frame>
<ScenResource> . . . </SceneResource>        // dynamic scene description file names (per
frame)
. . .
<SceneResource> . . . </SceneResource>
</Frame>
. . .
<Frame>
<ScenResource> . . . </SceneResource>
. . .
<SceneResource> . . . </SceneResource>
</Frame>
</Scene>
<Shader>
<ShaderResource> . . . </ShaderResource>     // bounded shader file names
. . .
<ShaderResource> . . . </ShaderResource>
</Shader>
<Texture>
<TextureResource> . . . </TextureResource>   // bounded texture file names
. . .
<TextureResource> . . . </TextureResource>
<Texture>
<Procedural>
<ProceduralResource> . . . </ProceduralResource>   // bounded procedural geometry file names
. . .
<ProceduralResource> . . . </ProceduralResource>
</Procedural>
</Resource>
<Display>
<DisplayPath> . . . <DisplayPath>            // location for downloading displayable
rendered images
<DisplayPreview>false</DisplayPreview>       // display preview option
</Display>
</SessionControl>
```

APPENDIX C

Sample Display Control File

```
<?xml version="1.0"?>
<!-- sample implementation file -->
<!DOCTYPE DisplayControl
[
<!ELEMENT DisplayControl (Header, Session, Display)>
<!ELEMENT Header (Comment, Date, PartnerId, ProjectName)>
<!ELEMENT Comment (#PCDATA)>
<!ELEMENT Date (#PCDATA)>
<!ELEMENT PartnerId (#PCDATA)>
<!ELEMENT ProjectName (#PCDATA)>
<!ELEMENT Session (SessionName, SessionId, SessionPrompt, NumFrames)>
<!ELEMENT SessionName (#PCDATA)>
<!ELEMENT SessionId (#PCDATA)>
<!ELEMENT SessionPrompt (#PCDATA)>
<!ELEMENT NumFrames (#PCDATA)>
<!ELEMENT Display (DisplayPath, DisplayPreview, Frame)>
<!ELEMENT DisplayPath (#PCDATA)>
<!ELEMENT DisplayPreview (#PCDATA)>
<!ELEMENT Frame (FrameIndex, RenderTime, ImageType, ImageFormat, ImageRes, ImageDepth)>
<!ELEMENT FrameIndex (#PCDATA)>
<!ELEMENT RenderTime (#PCDATA)>
<!ELEMENT ImageType (#PCDATA)>
<!ELEMENT ImageFormat (#PCDATA)>
<!ELEMENT ImageRes (#PCDATA)>
<!ELEMENT ImageDepth (#PCDATA)>
]>
<DisplayControl>
<Header>                                     // general info about the remote site
<Comment>Believe Remote Rendering Service</Comment>
<Date>Thursday,Jan. 11,2001</Date>
```

APPENDIX C-continued

Sample Display Control File

```
<PartnerId>ILM</PartnerId>                                   // or user id
<ProjectName> . . . </Projectname>                           // project name - session parent
</Header>
<Session>
<SessionName>ToyStory3Scene05Shot027</SessionName>           // session unique identifier string
<SessionId>ILM012345</SessionId>                             // session id registered on Believe's site
<SessionPrompt>ASAP</SessionPrompt>                          // level of session execution promptness
<NumFrames> . . . </NumFrames>                               // total number of frames rendered
</Session>
<Display>
<DisplayPath> . . . </DisplayPath>                           // remote location of downloaded displayable
images
<DisplayPreview>false</DisplayPreview>                       // display preview option
<Frame>                                                      // frame data: render time, type, format,
resolution
<FrameIndex> . . . </FrameIndex>
<RenderTime> . . . </RenderTime>                             // in hours
<ImageType> . . . </ImageType>
<ImageFormat> . . . </ImageFormat>
<ImageRes> . . . </ImageRes>
<ImageDepth>false<ImageDepth>                                // marks the presence of a depth image file
</Frame>
. . .
<Frame>
<FrameIndex> . . . </FrameIndex>
<RenderTime> . . . </RenderTime>
<ImageType> . . . </ImageType>
<ImageFormat> . . . </ImageFormat>
<ImageRes> . . . </ImageRes>
<ImageDepth>true<ImageDepth>
</Frame>
</Display>
</DisplayControl>
```

APPENDIX D

Sample Shader Generation Control File

```
<?xml version="1.0"?>
<!-- sample implementation file -->
<!DOCTYPE ShaderControl
[
<!ELEMENT ShaderControl (Shader)>
<!ELEMENT Shader (ResourceSources, ShaderMake)>
<!ELEMENT ResourceSources (ShaderSource)>
<!ELEMENT ShaderSource (#PCDATA)>
<!ELEMENT ShaderMake (#PCDATA)>
]>
<ShaderControl>
<Shader>
<ResourceSources>
```

APPENDIX D-continued

Sample Shader Generation Control File

```
<ShaderSource> . . . </ShaderSource>      // shader source file
name (.sl, .h, .c, .cpp)
. . .
<ShaderSource> . . . </ShaderSource>
</ResourceSources>
<ShaderMake> . . . </ShaderMake>          // shader make file (.mak)
</Shader>
<Shader>
. . .
</Shader>
</ShaderControl>
```

APPENDIX E

Sample Texture Generation Control File

```
<?xml version="1.0"?>
<!-- sample implementation file -->
<!DOCTYPE TextureControl
[
<!ELEMENT TextureControl (Texture)>
<!ELEMENT Texture (Input, Output, Mode, Filter)>
<!ELEMENT TextureType (#PCDATA)>
<!ELEMENT TextureSubType (#PCDATA)>
<!ELEMENT Input (ImageFile)>
<!ELEMENT ImageFile (#PCDATA)>
<!ELEMENT Output (TextureFile, NumBytes, Float)>
<!ELEMENT TextureFile (#PCDATA)>
<!ELEMENT NumBytes (#PCDATA)>
<!ELEMENT Float (#PCDATA)>
<!ELEMENT Mode (SWrap, TWrap, RWrap)>
<!ELEMENT SWrap (#PCDATA)>
```

APPENDIX E-continued

Sample Texture Generation Control File

```
<!ELEMENT TWrap (#PCDATA)>
<!ELEMENT RWrap (#PCDATA)>
<!ELEMENT Filter (Func, SWidth, TWidth, RWidth)>
<!ELEMENT Func (#PCDATA)>
<!ELEMENT SWidth (#PCDATA)>
<!ELEMENT TWidth (#PCDATA)>
<!ELEMENT RWidth (#PCDATA)>
<!ELEMENT TextureDepth (#PCDATA)>
<!ELEMENT FieldOfView (#PCDATA)>
]>
<TextureControl>
<Texture>
<TextureType> . . . </TextureType>            // one of 2D, 3D, environment, bump, shadow
<TextureSubType> . . . </TextureSubType>      // one of cube, longlat (for environment map)
<Input>
<ImageFile> . . . </ImageFile>                // input image file name(s)
. . .
<ImageFile> . . . </ImageFile>
</Input>
<Output>
<TextureFile> . . . </TextureFile>            // output texture file name
<NumBytes> . . . </NumBytes>                  // number of bytes per component (1, 2 or 4)
<Float> . . . </Float>                        // takes true or false, used for either 2 or 4 bytes
</Output>
<Mode>
<SWrap> . . . </SWrap>                        // one of black, clamp, periodic
<TWrap> . . . </TWrap>
<RWrap> . . . </RWrap>
</Mode>
<Filter>
<Func> . . . </Func>                          // one of box, triangle, catmull-rom, b-spline, gaussian,
sinc
<SWidth> . . . </SWidth>
<TWidth> . . . </TWidth>
<RWidth> . . . </RWidth>
</Filter>
<TextureDepth> . . . </TextureDepth>          // texture depth for 3D textures
<FieldOfView> ... </FieldOfView>              // field-of-view for cubic environment map
</Texture>
<Texture>
. . .
</Texture>
</TextureControl>
```

APPENDIX F

Sample Procedural Generation Control File

```
<?xml version="1.0"?>
<!-- sample implementation file -->
<!DOCTYPE ProceduralControl
[
<!ELEMENT ProceduralControl (Procedural)>
<!ELEMENT Procedural (ResourceSources, ProceduralMake)>
<!ELEMENT ResourceSources (ProceduralSource)>
<!ELEMENT ProceduralSource (#PCDATA)>
<!ELEMENT ProceduralMake (#PCDATA)>
]>
<ProceduralControl>
<Procedural>
<ResourceSources>
<ProceduralSource> . . . </ProceduralSource>     // procedural source
file name (.h, .c, .cpp)
. . .
<ProceduralSource> . . . </ProceduralSource>
</ResourceSources>
<ProceduralMake> . . . </ProceduralMake>         // procedural make
file (.mak)
</Procedural>
<Procedural>
. . .
</Procedural>
</ProceduralControl>
```

APPENDIX G

Rendering Request Dispatch API Description

This section describes the api for dispatching rendering requests from the rrp server to the scene server. Also, included in this discussion is the scooping of rendering status format, deposited by the scene server into a session node folder. The api is termed the Render Request Interface (or rri for short). The interface is layered on top of a networking library.

In general, both the rrp and the scene server can potentially be realized by using multiple physical host platforms for the sake of scalability. To this extend a load balancer would potentially mediate rendering requests to multiple scene servers. The rrp server keeps track of the submitted rendering queue depth for each scene server it communicates with. Additional rendering requests are dispatched only once the scene server submitted queue is not full.

The list of rri api entry points, as viewed from the rrp server stand point, and a brief description follows:

Network start/stop:

initialize( ): initialize communication with scene server whenever restarting the rrp server.

shutdown( ): shutdown communication with the scene server, whenever the rrp server is stopped.

Connection scope:

frameStart(String serverName): opens a connection to the scene server.

frameEnd( ): closes the opened connection with the scene server.

Render request:

sessionNode(String path): provides the session node path to the scene server as a key/value string pair e.g. "SessionPath=<path>".

renderFrame(String scene): rendering request providing a stream to the scene server, holding the scene description e.g. "Scene=\n" followed by the scene description.

The scene server is expected to deposit periodically status for each frame in rendering progress. The status is recorded in an xml file in the status session node folder e.g. the scene server appends /status to the session path provided in the session node entry point. The naming convention for a frame status file is: frame_status_<frame_index>.xml. Note that the frame index is the physical frame number represented in four decimal digits e.g. frame_status__0001.txt.

The format of the status xml file is depicted:

```
<?xml version="1.0"?>
<!-- sample implementation file -->
<!DOCTYPE StatusControl
[
<!ELEMENT StatusControl (FrameIndex, Status)>
<!ELEMENT FrameIndex (#PCDATA)>
<!ELEMENT Status (TimeOfDay, Progress, Error, Duration, Complexity)>
<!ELEMENT TimeOfDay (#PCDATA)>
<!ELEMENTProgress (#PCDATA)>
<!ELEMENT Error (#PCDATA)>
<!ELEMENTDuration (#PCDATA)>
<!ELEMENTComplexity (#PCDATA)>
]>
<StatusControl>
<FrameIndex> . . . <FrameIndex>
<Status>
<TimeOfDay>2001-04-26 23:05:34</TimeOfDay>   # time of day in iso format yyyy-MM-dd hh:mm:ss
<Progress>.5<./Progress>                     # a float value in the range of .0f to 1.f
<Error>Success(0)</Error>                    # one of Success or Failure, error code in parenthesis
<Duration>23.6</Duration>                    # a float value of rendering duration in minutes
<Complexity>6</Complexity>                   # frame complexity in the scale of 1 to 10
</Status>
</StatusControl>
```

Final rendered images per frame are deposited into the display folder of the session node e.g. the scenes server appends /display to the session path provided in the session node entry point.

APPENDIX H

Sample Batch Control File

```
<?xml version="1.0"?>
<!-- sample implementation file -->
<!DOCTYPE BatchControl
[
<!ELEMENT BatchControl (Header, Session)>
<!ELEMENT Header (Comment, TimeOfDay, PartnerId)>
<!ELEMENT Comment (#PCDATA)>
<!ELEMENT TimeOfDay (#PCDATA)>
<!ELEMENT PartnerId (#PCDATA)>
<!ELEMENT Session (SessionName, SessionPriority, SessionPrompt)>
<!ELEMENT SessionName (#PCDATA)>
<!ELEMENT SessionPriority (#PCDATA)>
<!ELEMENT SessionPrompt (#PCDATA)>
]>
<BatchControl>
<Header>
<Comment>Believe Remote Rendering Service</Comment>
```

APPENDIX H-continued

Sample Batch Control File

```
<TimeOfDay>Monday,May 21,2001</TimeOfDay>        # time of day
in iso format yyyy-MM-dd hh:mm:ss
<PartnerId>Sony</PartnerId>
</Header>
<Session>
<SessionName>Movie__Scene__Shot0</SessionName>   # session
unique identifier string
<SessionPriority>2</SessionPriority>             # session priority
<SessionPrompt>ASAP</SessionPrompt>              # session
execution promptness (billing)
</Session>
...
<Session>
...
</Session>
</BatchControl>
```

Whereas many alterations and modifications of the present invention will no doubt become apparent to a person of ordinary skill in the art after having read the foregoing description, it is to be understood that the particular embodiments shown and described by way of illustration are in no way intended to be considered limiting. For example, while the preferred embodiments supra are described in terms of a rendering process that converts three-dimensional modeling data into two-dimensional images, the output of the rendering process might also be three-dimensional renderings (e.g., holograms) without departing from the scope of the preferred embodiments. Therefore, reference to the details of the preferred embodiments are not intended to limit their scope, which is limited only by the scope of the claims set forth below.

What is claimed is:

1. A rendering method comprising:

receiving a plurality of control files at a rendering server, the plurality of control files sent from a computer workstation, the control files relating to a rendering request from the computer workstation and including identifiers of rendering resources currently available at the computer workstation that are required to perform a rendering task, wherein the rendering server is configured to perform the rendering task;

sending a set of invalid resource file identifiers from the rendering server to the computer workstation, wherein the set of invalid resource file identifiers is based on a comparison of the identifiers of rendering resources received from the computer workstation with identifiers of rendering files currently available at the rendering server;

receiving selected rendering resource files at the rendering server sent by the computer workstation in response to having sent the invalid resource file identifiers from the rendering server, the rendering resource files corresponding to the invalid resource file identifiers; and sending rendered frames from the rendering server to the computer workstation.

2. The rendering method of claim 1, wherein receiving selected rendering resource files further comprises:

receiving chunks of data from the computer workstation at the rendering server, wherein the chunks of data correspond to individual frames of the rendering task.

3. The rendering method of claim 1, wherein receiving the plurality of control files further comprises:

receiving an authentication control file at the rendering server to initiate a rendering session; and receiving a session control file and resource generation control files at the rendering server to specify rendering resources required to process the rendering request.

4. The rendering method of claim 3, wherein the authentication and session control files are transmitted from and stored on the computer workstation.

5. The rendering method of claim 3, further comprising:

transmitting a session ID from the rendering server if the rendering request represents a new rendering session.

6. The rendering method of claim 5, further comprising:

sending session status information to a computer workstation in response to a session status query from the computer workstation.

7. The rendering method of claim 6, further comprising:

transmitting display control files from the rendering server for storing with the rendered frames at the computer workstation.

8. The rendering method of claim 1, wherein the control files include at least one static scene description file and at least one dynamic scene description file.

9. The rendering method of claim 8, wherein receiving selected rendering resource files further comprises:

receiving rendering resources identified by the static scene description file only once in connection with the rendering request.

10. The rendering method of claim 1, further comprising:

determining a rendering mode for the rendering request; and providing output from the rendering server responsive to the rendering request in an interactive fashion in response to a rendering mode determined to be interactive.

11. A rendering method comprising:

transmitting a plurality of control files from a computer workstation to a rendering server, the control files relating to a rendering request from the computer workstation and including identifiers of rendering resources currently available at the computer workstation that are required to perform a rendering task, wherein the rendering server is configured to perform the rendering task;

receiving a set of invalid resource file identifiers from the rendering server, wherein the set of invalid resource file identifiers is based on a comparison of the identifiers of rendering resources sent from the computer workstation to the rendering server with identifiers of rendering files currently available at the rendering server;

selectively uploading rendering resource files from the computer workstation to the rendering server in response to having received the set of invalid resource file identifiers from the rendering server, the rendering resource files corresponding to the invalid resource file identifiers; and receiving rendered frames from the rendering server at the computer workstation.

12. The method of claim 11 further comprising:

forming chunks of data from the rendering resource files, the chunks corresponding to individual frames of the rendering task; and uploading the chunks of data from the computer workstation to the rendering server.

13. The method of claim 11, wherein transmitting the plurality of control files comprises:

transmitting an authentication control file to the rendering server to initiate a rendering session; and transmitting a session control file and resource generation control files to the rendering server to specify rendering resources required to process the rendering request.

14. The method of claim 13 further comprising:

transmitting an authentication control file to the rendering server to initiate a rendering session; and receiving a session control file and resource generation control files at the rendering server to specify rendering resources required to process the rendering request.

15. The method of claim 14 further comprising:

creating session folders at the user site; and storing the authentication and session control files in the session folders.

16. The method of claim 13, further comprising:

receiving a session ID from the rendering server when the rendering request represents a new rendering session.

17. The method of claim 16, further comprising:

periodically querying the rendering server to obtain session status information.

18. The method of claim 17, further comprising:

receiving display control files from the rendering server; and storing the display control files and the rendered frames at the computer workstation.

19. The method of claim 18, further comprising:

directing the rendered frames to a plug-in interface adapted for use with a modeling application.

20. The method of claim 11, wherein the control files include at least one static scene description file and at least one dynamic scene description file.

21. The method of claim 20, further comprising:

manipulating a modeling application at the computer workstation to produce the static and dynamic scene description files.

22. The method of claim 20, wherein selectively uploading rendering resource files further comprises:

uploading rendering resources identified by the static scene description file only once in connection with the rendering request.

23. The method of claim 11, further comprising:

receiving output from the rendering server responsive to the rendering request in an interactive fashion when the rendering server has determined that the rendering mode for the rendering request is inactive.

24. An apparatus comprising:

a processor;

a storage device including a project storage area; and a file transfer component for transmitting a plurality of control files from the project storage area to the rendering server via the communication network, the control files relating to a rendering request and including identifiers of rendering resources currently available in the project storage area required to perform a rendering task, wherein the rendering task is performed at the rendering server, wherein the processor causes the file transfer component to selectively upload rendering resource files from the project storage area to the rendering server via the communication network in response to receiving a set of invalid resource file identifiers from the rendering server, the rendering resource files corresponding to the set of invalid resource file identifiers received from the rendering server, and wherein the processor causes the storage device to store rendered frames received from the rendering server in the project storage area.

25. The apparatus of claim 24, wherein the processor is configured to form chunks of data from the rendering resource files, the chunks corresponding to individual frames of the rendering task; and the processor causes the file transfer component to upload the chunks to the rendering server.

26. The apparatus of claim 24, wherein the processor causes the file transfer component to transmit an authentication control file to the rendering server to initiate a rendering session, and the processor causes the file transfer component to transmit a session control file and resource generation control files to the rendering server to specify rendering resources required to process the rendering request.

27. The apparatus of claim 26, further comprising a plug-in component for creating session folders in the project storage area and for storing the authentication and session control files in the session folders.

28. The apparatus of claim 26, wherein a session ID is received from the rendering server if the rendering request represents a new rendering session.

29. The apparatus of claim 28, wherein the processor periodically queries the rendering server to obtain session status information.

30. The apparatus of claim 29, wherein the file transfer component receives display control files from the rendering server; and wherein the processor causes the display control files and the rendered frames to be stored in the project storage area.

31. The apparatus of claim 30, wherein the processor is operative to send the rendered frames to a plug-in interface adapted for use with a modeling application.

32. The apparatus of claim 24, wherein the control files include at least one static scene description file and at least one dynamic scene description file.

33. The apparatus of claim 32, wherein the processor is operative to manipulate a modeling application at the user site thereby to produce the static and dynamic scene description files.

34. The apparatus of claim 32, wherein the processor causes the file transfer component to upload rendering resources identified by the static scene description file only once in connection with the rendering request.

35. The apparatus of claim 24, wherein the processor is operative to determine a rendering mode for the rendering request; and provide output from the rendering server responsive to the rendering request in an interactive fashion in response to a rendering mode determined to be interactive.

36. A rendering method comprising:

receiving a plurality of rendering requests from one or more computer workstations at a computing device configured to administer a plurality of rendering sessions between a rendering server and the one or more computer workstations, each rendering request including a corresponding set of identifiers of rendering resources required to perform a rendering task that are currently available at the computer workstation that originated the corresponding rendering request;

transmitting a plurality of sets of control files from the computing device to the rendering server, each set of control files relating to a respective one of the rendering requests, wherein the rendering server is configured to perform the rendering tasks corresponding to the respective rendering requests;

receiving a plurality of sets of invalid resource file identifiers from the rendering server at the computing device in response to having transmitted the plurality of sets of control files to the rendering server, each set of invalid resource identifiers corresponding to a set of control files for a respective one of the rendering requests, wherein each set of invalid resource file identifiers indicates results of a comparison of the identifiers of rendering resources sent from the computing device configured to administer the plurality of rendering sessions with identifiers of rendering files currently available at the one or more computer workstations that originated the rendering requests;

for each set of invalid resource file identifiers, selectively uploading rendering resource files received at the computing device from the originating computer workstation to the rendering server in response to having received the plurality of sets of invalid resource file identifiers from the rendering server, the rendering resource files corresponding to the invalid resource file identifiers in the set of invalid resource identifiers; and receiving a plurality of rendered frames from the rendering server corresponding to the respective rendering requests.

37. The rendering method of claim 36, wherein the control files are retrieved from session control folders at the computing device configured to administer the plurality of rendering sessions.

38. The rendering method of claim 36, further comprising:

associating a workstation identifier at the computing device with each rendering request; and directing rendered frames received from the rendering server to a computer workstation that is associated with the workstation identifier.

* * * * *